US012426105B2

(12) United States Patent
Chung

(10) Patent No.: US 12,426,105 B2
(45) Date of Patent: Sep. 23, 2025

(54) METHOD AND APPARATUS FOR MANAGING WIRELESS CONNECTION OF ELECTRONIC DEVICE

(71) Applicant: Samsung Electronics Co., Ltd., Gyeonggi-do (KR)

(72) Inventor: Seungtaek Chung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 331 days.

(21) Appl. No.: 18/110,166

(22) Filed: Feb. 15, 2023

(65) Prior Publication Data
US 2023/0199866 A1 Jun. 22, 2023

Related U.S. Application Data

(63) Continuation of application No. PCT/KR2022/000166, filed on Jan. 5, 2022.

(30) Foreign Application Priority Data

Jan. 12, 2021 (KR) .................. 10-2021-0004229

(51) Int. Cl.
H04W 4/00 (2018.01)
H04W 8/24 (2009.01)
H04W 76/10 (2018.01)

(52) U.S. Cl.
CPC ............ H04W 76/10 (2018.02); H04W 8/24 (2013.01)

(58) Field of Classification Search
CPC ......... H04W 76/10; H04W 8/24; H04W 4/02; H04W 8/005; H04W 12/03; H04W 76/14;
(Continued)

(56) References Cited

U.S. PATENT DOCUMENTS 6,940,407 B2 * 9/2005 Miranda-Knapp .... G08B 25/08
340/568.1
7,590,837 B2 * 9/2009 Bhansali ............. H04W 12/082
714/36
(Continued)

FOREIGN PATENT DOCUMENTS

EP 1 684 535 7/2006
EP 2 672 420 12/2013
(Continued)

OTHER PUBLICATIONS

European Search Report dated Mar. 21, 2024 issued in counterpart application No. 22739562.1-1215, 8 pages.
(Continued)

*Primary Examiner* — Phuongchau Ba Nguyen
(74) *Attorney, Agent, or Firm* — The Farrell Law Firm, P.C.

(57) ABSTRACT

Disclosed is an electronic device including a communication module supporting a wireless communication connection, at least one processor operatively connected with the communication module, and a memory operatively connected with the at least one processor, wherein the memory stores instructions which, when executed, cause the at least one processor to set a channel connection with an external electronic device through the communication module, obtain information related to the external electronic device, determine maximum allowed connections of the external electronic device or whether to perform broadcasting of the external electronic device based on the information related to the external electronic device, and transmit, to the external electronic device, setting information comprising at least one of the determined maximum allowed connections or whether to perform the broadcasting.

18 Claims, 19 Drawing Sheets

(58) Field of Classification Search
CPC ....... H04W 76/15; H04W 84/18; H04W 4/06; H04W 4/80; H04W 12/08; H04W 88/02; H04W 80/04; H04W 88/06; H04W 88/08; H04L 63/0442; H04L 29/06; Y02D 30/70
See application file for complete search history.

(56) References Cited

U.S. PATENT DOCUMENTS

| | | | | |
|---|---|---|---|---|
| 8,942,719 | B1 * | 1/2015 | Hyde | H04W 12/06 726/17 |
| 9,258,715 | B2 * | 2/2016 | Borghei | H04M 3/42221 |
| 9,813,992 | B2 | 11/2017 | Peinhardt et al. | |
| 9,848,299 | B1 | 12/2017 | Kumar et al. | |
| 9,900,733 | B2 * | 2/2018 | Beattie, Jr. | H04W 4/029 |
| 9,911,311 | B1 | 3/2018 | Kumar et al. | |
| 10,200,812 | B2 | 2/2019 | Elias | |
| 10,262,515 | B2 | 4/2019 | Ritala et al. | |
| 10,562,496 | B1 * | 2/2020 | Elangovan | H04W 4/40 |
| 10,645,655 | B2 | 5/2020 | de Barros Chapiewski | |
| 10,652,821 | B2 | 5/2020 | Doyle et al. | |
| 10,939,228 | B2 * | 3/2021 | Arunkumar | H04W 12/64 |
| 10,999,653 | B2 | 5/2021 | Dahm et al. | |
| 2003/0134648 | A1 * | 7/2003 | Reed | H04W 4/029 455/456.1 |
| 2006/0135176 | A1 * | 6/2006 | Xiong | G01S 19/25 455/456.1 |
| 2006/0161628 | A1 * | 7/2006 | Nagy | H04W 4/029 709/206 |
| 2014/0221003 | A1 | 8/2014 | Mo et al. | |
| 2016/0066173 | A1 | 3/2016 | Glezer et al. | |
| 2017/0006425 | A1 | 1/2017 | Tang et al. | |
| 2019/0230451 | A1 | 7/2019 | Dickmann et al. | |
| 2020/0304369 | A1 | 9/2020 | Chapiewski et al. | |
| 2020/0336995 | A1 | 10/2020 | Ripplinger et al. | |

FOREIGN PATENT DOCUMENTS

| | | |
|---|---|---|
| JP | 2007-150904 | 6/2007 |
| JP | 2016-025495 | 2/2016 |
| JP | 2016-212794 | 12/2016 |
| KR | 10-2014-0138009 | 12/2014 |
| KR | 10-2016-0006128 | 1/2016 |
| KR | 10-2017-0104411 | 9/2017 |
| KR | 10-1901671 | 9/2018 |
| KR | 10-2022-0018874 | 2/2022 |
| KR | 10-2022-0095740 | 7/2022 |
| KR | 10-2022-0102036 | 7/2022 |
| RU | 2 636 140 | 11/2017 |

OTHER PUBLICATIONS

Search Report dated May 3, 2022 issue in counterpart application No. PCT/KR2022/000166, pp. 5.
Written Opinion dated May 3, 2022 issue in counterpart application No. PCT/KR2022/000166, pp. 3.
Russian Office Action dated Apr. 23, 2025 issued in counterpart application No. 2023121035/07, 8 pages.
Japanese Office Action dated Jun. 17, 2025 issued in counterpart application No. 2023-539863, 7 pages.
Russian Decision on Grant dated Jul. 23, 2025 issued in counterpart application No. 2023121035/07, 20 pages.

* cited by examiner

METHOD AND APPARATUS FOR MANAGING WIRELESS CONNECTION OF ELECTRONIC DEVICE

CROSS-REFERENCE TO RELATED APPLICATIONS

This application is a Bypass Continuation Application of International Application No. PCT/KR2022/000166, which was filed on Jan. 5, 2022, and is based on and claims priority under 35 U.S.C. § 119 to Korean Patent Application No. 10-2021-0004229, which was filed in the Korean Intellectual Property Office on Jan. 12, 2021, the entire disclosure of each of which is incorporated herein by reference.

BACKGROUND

1. Field

The disclosure relates generally to an electronic device, and more particularly, to a technique for setting and managing wireless communication connection of an electronic device.

2. Description of Related Art

As the selection of various electronic products has increased in recent times, use of electronic devices such as a smart watch, earphones, and a tablet in connection with a smartphone has increased. A small-sized electronic device such as an earphone is subject to loss due to common use. A manufacturer or a service provider may provide a service for locating the electronic device for the loss.

The locating service of the electronic device may be provided in a manner that, if the electronic device which is to be located broadcasts a signal including identification information to notify its presence, nearby mobile devices scan and register the device to a designated server with positioning information, and the designated server shares the positioning information with a mother terminal which is registered with the same account as the electronic device. In so doing, even if the mother terminal is close to the electronic device based on the positioning information, it may be difficult to control the electronic device while the electronic device maintains connection with another nearby terminal. To overcome this limitation, various schemes for controlling the electronic device while the electronic device maintains connection with another terminal are needed.

The other terminal (e.g., a mother terminal, one or more terminals registered with the same group account, or a terminal identified to be reliable) for inter-operating with an electronic device while the electronic device maintains connection with a nearby device may forward control information to the electronic device via a designated server and thus indirectly control the electronic device. In this case, since the terminal, which is at a close distance allowing short-range wireless communication connection with the electronic device, forwards the control information via the server, communication cost and time taken to forward the control information to the electronic device may increase. In addition, the control information may not be delivered to the electronic device, unless the terminal resides in an environment for network communication with the server.

A scheme is needed for allowing a plurality of channel connections such that the other terminal positioned in vicinity may at least temporarily control the electronic device while the electronic device maintains connection with any one nearby device. For example, while the electronic device maintains the connection with any one device over a normal channel, other nearby devices may at least temporarily control the electronic device over a reserved channel. In this case, the electronic device, which may set connections with a plurality of devices, may broadcast a signal including its connection state information while maintaining channel connection with at least one device. However, this operation may increase workload and battery consumption of the electronic device. Therefore, there is a need in the art for a method and apparatus that enables a terminal to temporarily control the electronic device via the plurality of channel connections without compromising battery life and workload of the electronic device.

SUMMARY

The disclosure has been made to address at least the above-mentioned problems and/or disadvantages and to provide at least the advantages described below.

Accordingly, an aspect of the disclosure is to provide a method for preventing the workload and the battery consumption of an electronic device from unnecessarily increasing, in providing a channel allowing another terminal positioned in the vicinity to at least temporarily control the electronic device while the electronic device maintains the connection with the nearby device.

Another aspect of the disclosure is to provide a method and apparatus that improves network communication efficiency by dynamically setting whether to allow an additional connection (or maximum allowed connections) of an electronic device based on electronic device related information, such that the electronic device may broadcast a signal including its connection state, thus preventing unnecessary battery consumption. In accordance with an aspect of the disclosure, an electronic device includes a communication module supporting a wireless communication connection, at least one processor operatively connected with the communication module, and a memory operatively connected with the at least one processor, wherein the memory stores instructions which, when executed, cause the at least one processor to set a channel connection with an external electronic device through the communication module, obtain information related to the external electronic device, determine maximum allowed connections of the external electronic device or whether to perform broadcasting of the external electronic device based on the information related to the external electronic device, and transmit, to the external electronic device, setting information comprising at least one of the determined maximum allowed connections or whether to perform the broadcasting.

In accordance with an aspect of the disclosure, a method of an electronic device for controlling an external electronic device includes setting a channel connection with the external electronic device, obtaining information related to the external electronic device, determining maximum allowed connections of the external electronic device or whether to perform broadcasting of the external electronic device based on the external electronic device information, and transmitting setting information including at least one of the determined maximum allowed connections or whether to perform the broadcasting to the external electronic device.

BRIEF DESCRIPTION OF THE DRAWINGS

The above and other aspects, features, and advantages of certain embodiments of the disclosure will be more apparent from the following detailed description taken in conjunction with the accompanying drawings, in which.

With regard to descriptions of the drawings, identical or similar reference numerals may be used to refer to identical or similar components.

DETAILED DESCRIPTION

Figure 1:
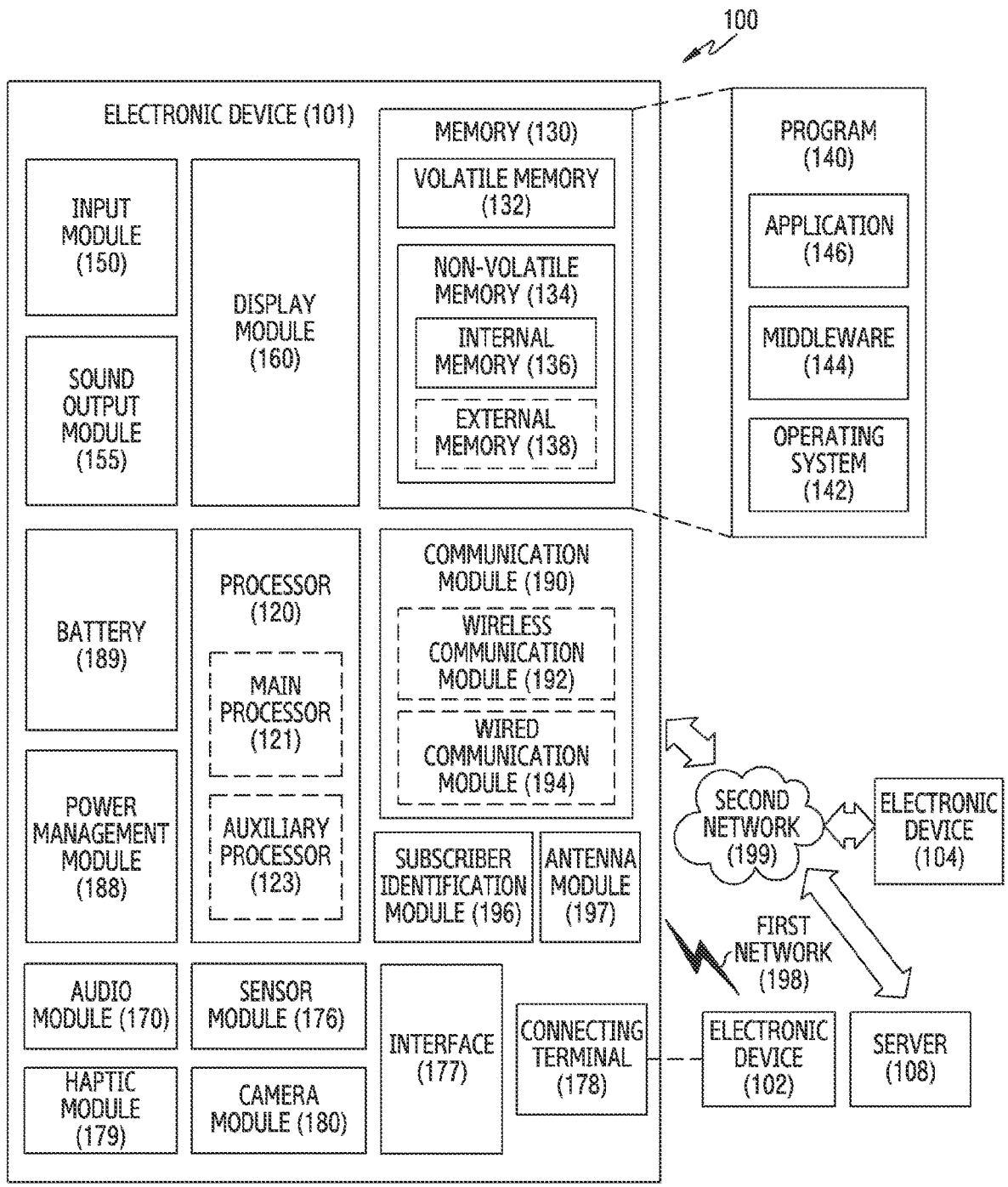
FIG. 1 is a block diagram of an electronic device in a network environment according to an embodiment.

Hereinafter, various embodiments described in the present disclosure are described with reference to the accompanying drawings. It should be understood that the embodiments are not limited to particular forms, but include various modifications, equivalents, and/or alternatives of the present disclosure. Descriptions of well-known functions and constructions are omitted for the sake of clarity and conciseness.

The electronic device according to embodiments may be one of various types of electronic devices. The electronic devices may include a portable communication device (e.g., a smartphone), a computer device, a portable multimedia device, a portable medical device, a camera, a wearable device, or a home appliance. However, the electronic devices are not limited to those described above.

With regard to the description of the drawings, similar reference numerals may be used to refer to similar or related elements. It is to be understood that a singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another and do not limit the components in importance or order. It is to be understood that if an element (e.g., a first element) is referred to, with or without the term "operatively" or "communicatively", as "coupled with," "coupled to," "connected with," or "connected to" another element (e.g., a second element), this indicates that the first element may be coupled with the second element directly (e.g., wiredly), wirelessly, or via a third element.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
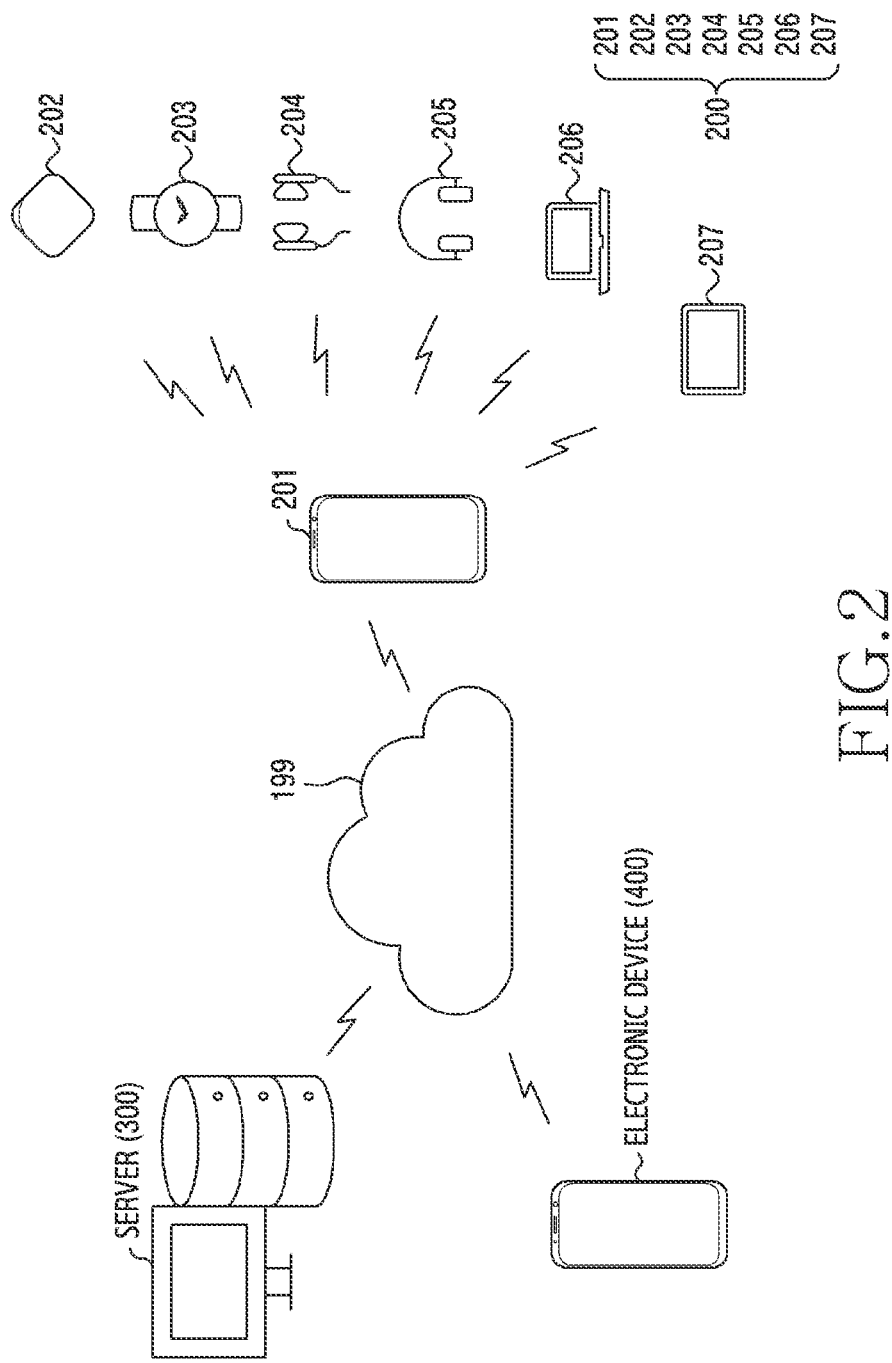
FIG. 2 illustrates a system for locating a user device according to an embodiment.

FIG. 2 illustrates a system for locating a user device according to an embodiment.

Referring to FIG. 2, the system may include user devices 200, a server 300, and an electronic device 400. The electronic device 400 and at least one device of the user devices 200 may be connected with the server 300 over a second network 199 (e.g., Wi-Fi, or a cellular network).

The user devices 200 may include a plurality of devices. For example, a user may further own, besides a first device 201 mostly used, at least one of a second device 202, a third device 203, a fourth device 204, a fifth device 205, a sixth device 206 or a seventh device 207. The first device 201 may be a mobile communication device such as a smartphone. The second device 202 is a small-sized tag device which may not be spotted easily, and may be manufactured in a form of a small-sized item such as a key ring or a button, or in a form attachable to other electronic device or an object. The third device 203 may be a wearable device such as a smart watch. The fourth device 204 may be wireless earphones such as earbuds. The fifth device 205 may be a Bluetooth™ headphone or headset. The sixth device 206 may be a notebook. The seventh device 207 may be a tablet. Alternatively, the user may inter-operate and use another proper device than the first device 201. For example, if a key fob, a wallet, a backpack, a dog or cat recognition device, a vehicle, a bicycle, an identification, a briefcase, an umbrella, and/or other gear satisfies a communication function described herein, it may be a device for inter-operating with the first device 201. If necessary (e.g., if lost), the first device 201 may perform location tracking on the inter-operating device. In addition, the user may use two or more identical devices. For example, the user may inter-operate and use a plurality of smartphones (e.g., the first device 201). Also, the user may inter-operate and use two or more tables (e.g., the seventh device 207) with the first device 201.

The user devices 200 may be interconnected using one or more communication protocols. For example, the first device 201 may be connected with at least one of the second device 202, the third device 203, the fourth device 204, the fifth device 205, the sixth device 206 or the seventh device 207 over a short-range network. For example, the short-range network for establishing connections between the user devices 200 may be properly selected. For example, Bluetooth™ low energy (BLE), Wi-Fi direct, near field communication (NFC), ultra-wide band (UWB) communication, or infra-red communication may be used to establish the connections between the user devices 200 together with or in lieu of Bluetooth™. The user devices 200 may establish their connections using a mesh network (e.g., Zigbee™, or Z-wave), as the short-range wireless communication.

The user devices 200 may have various methods for connecting each other, according to device information (e.g., device component). For example, if at least one of the user devices 200 is an internet protocol (IP) based (IP address) device, it may establish connection with the second network 199 using a service set identifier (SSID). If at least one of the user devices 200 is not the IP based device, it may establish connection with the second network 199, using the first device 201 or a hub device.

At least one of the user devices 200 may broadcast an advertising packet for providing a finding function for the loss. For example, if determining that it is lost, the second device 202 may broadcast various information including its (e.g., the second device 202) identification information using a packet. The packet may be broadcast to be received at one or more electronic devices located within a designated communication distance besides the second device 202. The packet, or the advertising packet may be understood as a signal, a message, or a beacon for recognizing that the device is lost.

At least one of the user devices 200 may determine its lost state according to various criteria. For example, if a first time (e.g., 15 minutes) passes from last connection with the mother terminal, or the first device 201 which is the main terminal, the second device 202 may determine entry to an offline state where the connection with the first device 201 is disconnected. For example, if a second time (e.g., 24 hours) further passes after the offline state entry, the second device 202 may determine that it is lost. In determining the lost state, the second device 202 may further consider a battery level in addition to the time. In this case, the battery level may be its (the second device 202) battery level, and the time may be the first time (e.g., 15 minutes) or the second time (e.g., 24 hours). The first time and the second time and/or the battery level may adopt various loss determination criteria by user setting or manufacture's standard.

The descriptions of the electronic device 101 with reference to FIG. 1 may be properly applied to the user devices 200. For example, if the first device 201 of the user is a smartphone, the first device 201 and the electronic device 101 may be the same devices. In addition, if the fourth device 204 of the user is an earbud having no display, other descriptions than the display module 160 in the descriptions of the electronic device 101 may be properly applied to the fourth device 204.

The server 300 may correspond to the server 108 of FIG. 1. If at least one of other devices 202, 203, 204, 205, 206, and 207 than the first device 201 among the user devices 200 is lost, the server 300 may provide a function for locating the at least one device which is lost. Herein, if the second device 202 of the user devices 200 is lost, an example of locating the lost second device 202 in the first device 201 is mainly described for sake of conciseness.

The electronic device 400 may be of another user who is different from the owner of the second device 202. The electronic device 400, which is near the second device 202, may directly or indirectly obtain the advertising packet broadcast from the second device 202. The electronic device 400 may include a short-range communication circuit for receiving the broadcast signal using a short-range communication scheme (e.g., BLE) by the second device 202. The electronic device 400 may include a global positioning system (GPS) circuit for measuring its location. The electronic device 400 may include a long-range communication circuit (e.g., a communication circuit supporting a cellular network and/or a Wi-Fi network) for transmitting information of the second device 202 and its location to the server 300.

The electronic device 400 may be of the same type (e.g., a smartphone) as the first device 201. Some or all of the explanations of the electronic device 101 described in FIG. 1 may be applied to the electronic device 400. Herein, descriptions of the configuration or the function of the first device 201 may be also applied to the electronic device 400, but may not be necessarily limited thereto. The electronic device 400 may be an arbitrary electronic device supporting the above-mentioned communication function.

Figure 3:
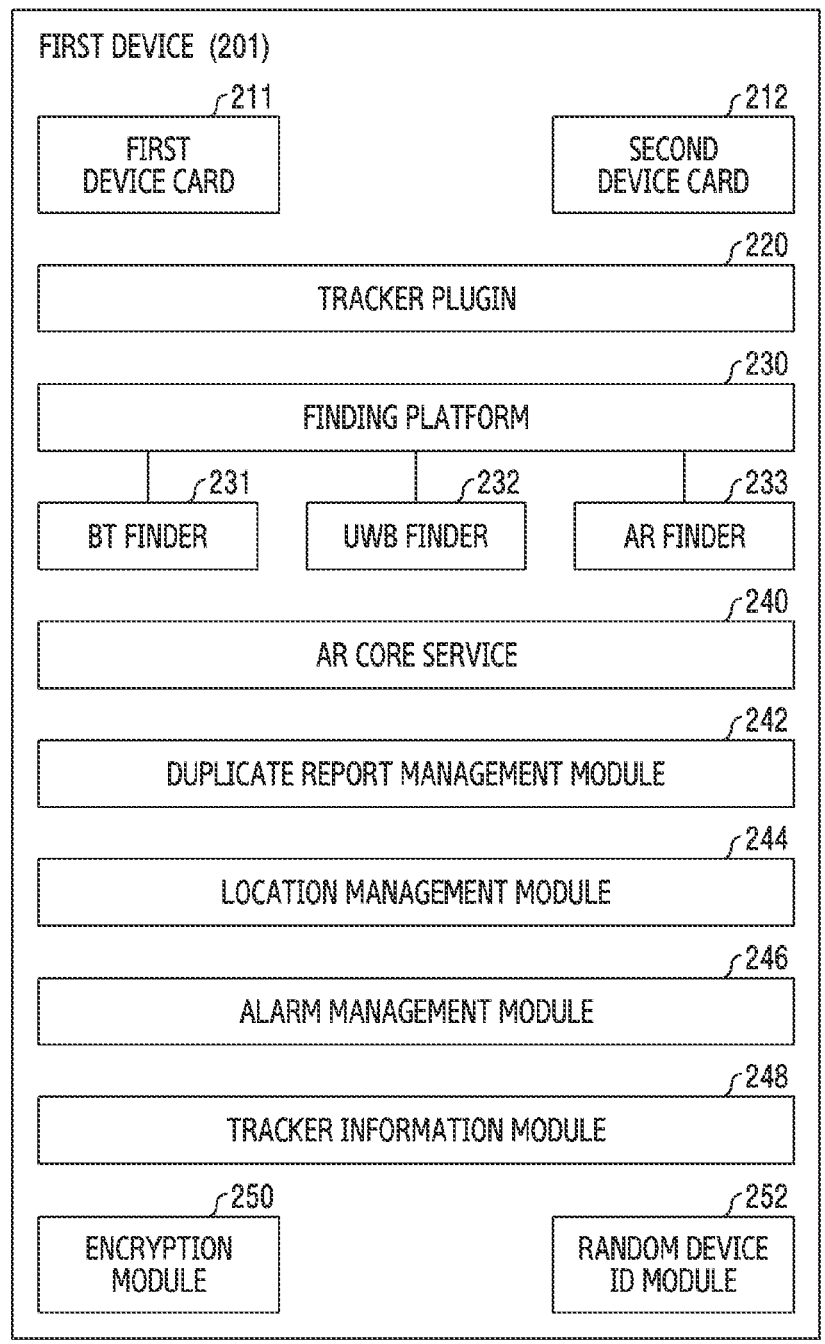
FIG. 3 illustrates modules related to various functions of an electronic device according to an embodiment.

FIG. 3 illustrates modules related to various functions of an electronic device according to an embodiment.

The various functions described in FIG. 3 may be understood as being supported by the first device 201 in finding the second device 202. In addition, the various functions described in FIG. 3 may be understood as being supported by the electronic device 400 in processing an advertising packet obtained from the second device 202. As stated above, the first device 201 and the electronic device 400 are merely divided depending on whether it is the user's device for finding the second device 202, or the user's device for providing help to find the second device 202. The functions described in FIG. 3 may be provided in the first device 201 and the electronic device 400 both. Hereinafter, descriptions are based on the first device 201.

The function or operation explained with reference to FIG. 3 may be understood as a function performed by a processor of the first device 201. The processor may execute commands (e.g., instructions) stored in a memory to implement software modules shown in FIG. 3, and control hardware associated with the function.

The first device 201 may manage at least one device card. For example, a first device card 211 of the first device 201 may be registered to the first device 201. In addition, a second device card 212 of the second device 202 which have inter-operated with the first device 201 may be registered to the first device 201. The first device card 211 or the second device card 212 may include device name and/or identification information, a device state, device battery information, device location history and/or device current location, or information such as a message related to the device. The information included in the first device card 211 and/or the second device card 212 may be set and/or changed through the user. For example, the user of the first device 201 and/or the second device 202 may set name, device type, or policy information related to the first device 201 and/or the second device 202.

The first device 201 and/or the second device 202 may share the same user account. In this case, the first device card 211 and the second device card 212 may be registered with respect to the same user account. For example, if receiving an input for locating a device inter-operating with the first device 201 by the user of the first device 201, the first device 201 may provide a user interface (UI) showing the information of the first device card 211 and the second device card 212 stored in the memory through a display (e.g., the display module 160 of FIG. 1).

The user account of the second device 201 may be different from the user account of the second device 202. In this case, if the first device 201 and the second device 202 having the different user accounts identify their reliability, the first device card 211 and the second device card 212 may be registered with respect to the same user account. For example, if a first user of the first device 201 and a second user of the second device 202 are identified as a family relationship, the information of the second device 202 may be identified through a first user account of the first user of the first device 201. Descriptions herein are based on the same user for convenience, but various embodiments may be applied even if the users of the first device 201 and the second device 202 are different.

A tracker plugin 220 may be understood as a module for registering the user device. For example, the first device 201 may drive the tracker plugin 220. The tracker plugin 220 may provide an easy setup pop, or provide registration using a quick response (QR) code (QR triggering), or a manual onboarding function. For example, the user may register the second device 202 to the server 300 in association with the user account, by capturing a QR code attached to one surface or a product case of the second device 202 using a camera (e.g., the camera module 180 of FIG. 1) mounted on the first device 201.

A finding platform 230 may perform a function for finding the lost electronic device. The finding platform 230 may control hardware to effectively find the electronic device according to a distance to the lost electronic device. For example, the finding platform 230 may operate together with a Bluetooth™ (BT) finder 231, a UWB finder 232, and/or an augmented reality (AR) finder 233. The BT finder 231 may control a Bluetooth™ communication circuit, the UWB finder 232 may control a UWB communication circuit, and the AR finder 233 may control the display.

The BT finder 231 may operate if the first device 201 and the second device 202 are within a first distance (e.g., about 100 meters (m)). The finding platform 230 may control the BT finder 231, to receive a packet from the second device 202 using the short-range communication circuit supporting the Bluetooth™ communication and/or the BLE communication, or to establish a short-range communication connection with the second device 202 if the gap between the first device 201 and the second device 202 is within the first distance.

The UWB finder 232 may operate if the first device 201 and the second device 202 are within a second distance (e.g., about 50 m) which is shorter than the first distance. The finding platform 230 may enable the UWB communication circuit connected with a plurality of UWB antennas to receive a UWB channel signal used for the location measurement, by controlling the UWB finder 232. The finding platform 230 may receive a UWB signal received from the second device 202 using the UWB communication circuit, and estimate the location of the second device 202 based on a time of arrival and/or an angle of arrival of the signal received at each UWB antenna.

The AR finder 233 may implement the AR on the display if the second device 202 is at a short distance and thus visually assist the user in finding the second device 202. Herein, the short distance may be substantially the same as the second distance, or may be within a third distance shorter than the second distance. The finding platform 230 may control the AR finder 233 to output image data acquired through the camera on the display, and to display the location of the second device 202 identified through the UWB finder 232 in a screen outputted on the display. If the first device 201 may not effectively receive the UWB signal from the second device 202 (e.g., if a receive sensitivity is below a threshold), the AR finder 233 may guide the first device 201 to have an adequate posture (angle) for receiving the UWB signal through the display.

If the AR finder 233 is enabled to operate, an AR core service 240 may also be enabled. The AR core service 240 may control the first device 201 to access a person/object recognition database stored in a memory and/or an AR service provision server to enhance an AR environment.

The BT finder 231, the UWB finder 232, and/or the AR finder 233 included in the finding platform 230 may operate simultaneously or selectively based on the distance to the second device 202. For example, if the distance of the first device 201 and the second device 202 is within the second distance (e.g., about 50 m), the BT finder 231 and the UWB finder 232 may operate at the same time or the UWB finder 232 may operate selectively.

A duplicate report management module 242 may, if the first device 201 receives an advertising packet from an arbitrary lost device (e.g., the second device 202), re-broadcast the received advertising packet, or manage an operation of reporting to the server. The duplicate report management module 242 may provide a function for preventing duplicate reporting of information of the arbitrary lost device (e.g., the second device 202). For example, the duplicate report management module 242 may perform a reporting/re-broadcasting operation to the server if the advertising packet received from the second device 202 satisfies a designated condition. The duplicate management module 242 may not perform the operation of reporting to the server or re-broadcasting if the advertising packet received from the second device 202 does not satisfy the designated condition. For example, the duplicate report management module 242 may operate if the first device 201 serves as the electronic device 400 for providing help to find the second device 202.

A location management module 244 may manage a current location and/or a location change history of the second device 202 obtained from the server 300. The location management module 244 may identify and/or manage the location of the first device 201 by controlling the location measurement circuit such as a GPS included in the first device 201.

An alarm management module 246 may manage alarm related information of the second device 202. The alarm related information may include an alarm control state obtained from the second device 202 and/or an alarm related command of the second device 202 obtained from the server 300. For example, when obtaining an alarm related characteristic value from the second device 202, the alarm management module 246 may identify and manage the alarm control state of the second device 202 based on the obtained alarm related characteristic value. When obtaining the alarm command of the second device 202 from the server 300, the alarm management module 246 may identify and manage the alarm control state of the second device 202 based on data included in the alarm command.

A tracker information module 248 may manage the type of the second device 202 and/or the identification information of the second device 202. The tracker information module 248 may operate if the first device 201 serves as the electronic device 400. For example, the tracker information module 248 may store and/or manage a device type (e.g., a smart watch, an earphone, a headphone, or a tablet), a communication type (e.g., whether to support the BLE, BT, the cellular network, or the UWB communication), and/or identification information (e.g., a device unique ID, a network identification ID, or a user defined ID) of the second device 202.

The tracker information module 248 may set and manage maximum allowed connections for the second device 202 and/or whether to perform the broadcasting. For example, the tracker information module 248 may determine the maximum allowed connections of the second device 202 based on the information of the second device 202, including at least one of a connection history, a location information history or a battery state of the second device 202. The tracker information module 248 may identify whether the second device 202 has been connected to at least one other external device during a designated time, or whether a battery of the second device 202 is over a designated level based on the information of the second device 202, and determine the maximum allowed connections according to the identifying result. For example, if it is identified that the second device 202 has never been connected to at least one other external device during the designated time, or the battery state is below the designated level, the tracker information module 248 may determine the maximum allowed connections of the second device 202 to be 1, thus to disabling an additional connection. If the maximum allowed connections are determined to be 1, the tracker information module 248 may determine not to broadcast the advertising packet for the second device 202 and may transmit to the second device 202 setting information including the maximum allowed connections and/or whether to perform the broadcasting operation. As another example, if it is identified that the second device 202 has been connected to at least one other external device during the designated time, or the battery state is over the designated level, the tracker information module 248 may determine the maximum allowed connections for the second device 202 to be at least 2. The tracker information module 248 may determine the maximum allowed connections to be at least 2, even if receiving from the server 300 a signal indicating that there is other nearby device requesting an additional connection for the second device 202. If the maximum allowed connections are determined to be at least 2, the tracker information module 248 may determine to broadcast the advertising packet to set the additional connection of the second device 202.

An end-to-end (E2E) encryption module 250 may perform E2E encryption. The E2E encryption module 250 may operate if the first device 201 serves as the electronic device 400. For example, if the electronic device 400 transmits a message including the identification information of the lost device and the location information of the electronic device 400 to the server 300 in response to receiving the advertising packet from the arbitrary lost device (e.g., the second device 202), the E2E encryption module 250 may apply an encryption algorithm to the message. If the E2E encryption module 250 encrypts the message using an encryption key related to the lost device, a device having a decryption key corresponding to the encryption key of the lost device may obtain the location information of the lost device. For example, the electronic device 400 may encrypt the message including the identification information of the second device 202 and the location information of the electronic device 400 with a public key of the second device 202 and transmit the message to the server 300. The first device 201 may obtain the encrypted information of the lost second device 202 from the server 300, and then identify the location of the second device 202 (e.g., the location of the electronic device 400) by decrypting it with a private key of the second device 202. For example, the first device 201 may obtain the private key of the second device 202 in registering the second device 202 to the user account or registering to the server 300, or in pairing with the second device 202.

A random device ID module 252 may change the device identification ID to a random ID using a designated algorithm. The random device ID module 252 may operate if the first device 201 serves as the electronic device 400. For example, if receiving the advertising packet from the second device 202, the electronic device 400 may transmit a message to the server 300 by changing the identification ID of the second device 202 to the random ID. The first device 201 may identify the ID of the second device 202 from the random ID using a designated algorithm.

Figure 4:
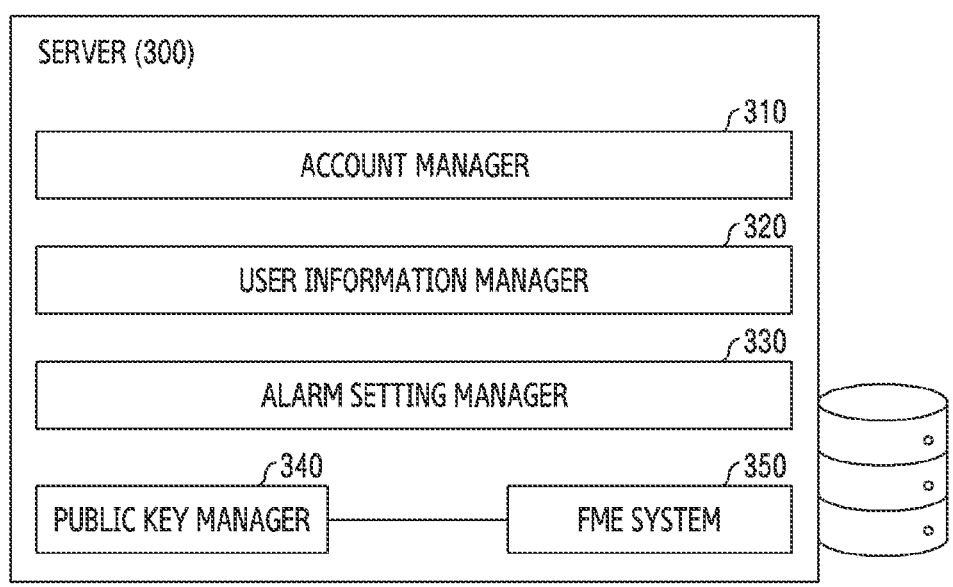
FIG. 4 illustrates modules related to various functions of a server according to an embodiment.

FIG. 4 illustrates modules related to various functions of a server according to an embodiment.

Referring to FIG. 4, the server 300 may include an account manager 310, a user information manager 320, an alarm setting manager 330, a public key manager 340, and a find my everything (FME) system 350. The components of the server 300 are classified in functional terms to implement various embodiments. The server 300 may be implemented through a plurality of hardware processors and storage devices. The server 300 may be understood as a plurality of servers. For example, the server 300 may include a first server for providing the electronic device finding serving in a first country and a second server for providing the electronic device finding serving in a second country.

The server 300 may include the account manager 310. The account manager 310 may manage a user account registered at the server 300 and/or at least one device connected with the user account. For example, if the first device 201, the second device 202, and the third device 203 are registered with a first user account, the account manager 310, which accepts a request related to the second device 202 from the first device 201, may allow the first device 201 to access the information of the second device 202 since the first device 201 and the second device 202 are connected to the same first user account.

The server 300 may include the user information manager 320. The user information manager 320 may manage registration, addition, deletion, and/or modification of user information associated with the user account. The user information manager 320 may store and manage device or user information associated with each user account. The information may include at least one of a location information history or a connection history per device (or user) registered at the server 300.

The server 300 may include the alarm setting manager 330. The alarm setting manager 330 may determine whether it is necessary to generate an alarm of the lost device (e.g., the second device 202). The server 300 may determine that the second device 202 is lost based on a first signal received from the electronic device 400. The first signal may include the identification information and the location information of the second device 202. The alarm setting manager 330 may determine to generate the alarm only if the second device 202 which is lost satisfies a designated condition. For example, if a designated time passes after the alarm generates at the second device 202 and the location information is continuously received from the same electronic device 400, or if a location change of the second device 202 is detected and the location information is received from the same electronic device 400, the alarm setting manager 330 may determine that it is necessary to generate the alarm at the second device 202. The alarm setting manager 330 may determine that it is necessary to generate the alarm of the second device 202 even if the location information related to the second device 202 is periodically received from a plurality of the electronic devices 400. Thus, the alarm setting manager 330 may generate and deliver an alarm command to be set for the second device 202 to at least one electronic device 400. In addition, the alarm setting manager 330 may manage alarm related data including a time, a count and/or a location of the alarm generating in the second device 202.

The public key manager 340 may manage public keys of devices registered at the server 300 on the user account basis, or on the device basis. For example, one public key may be set for one user account. As another example, if five devices are connected with the same user account, five different public keys may be assigned to the five devices respectively.

The FME system 350 may perform processing to provide the lost device finding service. For example, if receiving a public key request for the lost second device 202 from the electronic device 400, the FME system 350 may obtain a public key of the second device 202 from the public key manager 340, and provide the obtained public key to the electronic device 400. The FME system 350 may identify the registered user account of the second device 202 through the account manager 310. The FME system 350 may identify location information corresponding to the user account and/or the second device 202 through the user information manager 320, and provide it to the first device 201 or the electronic device 400.

Figure 5:
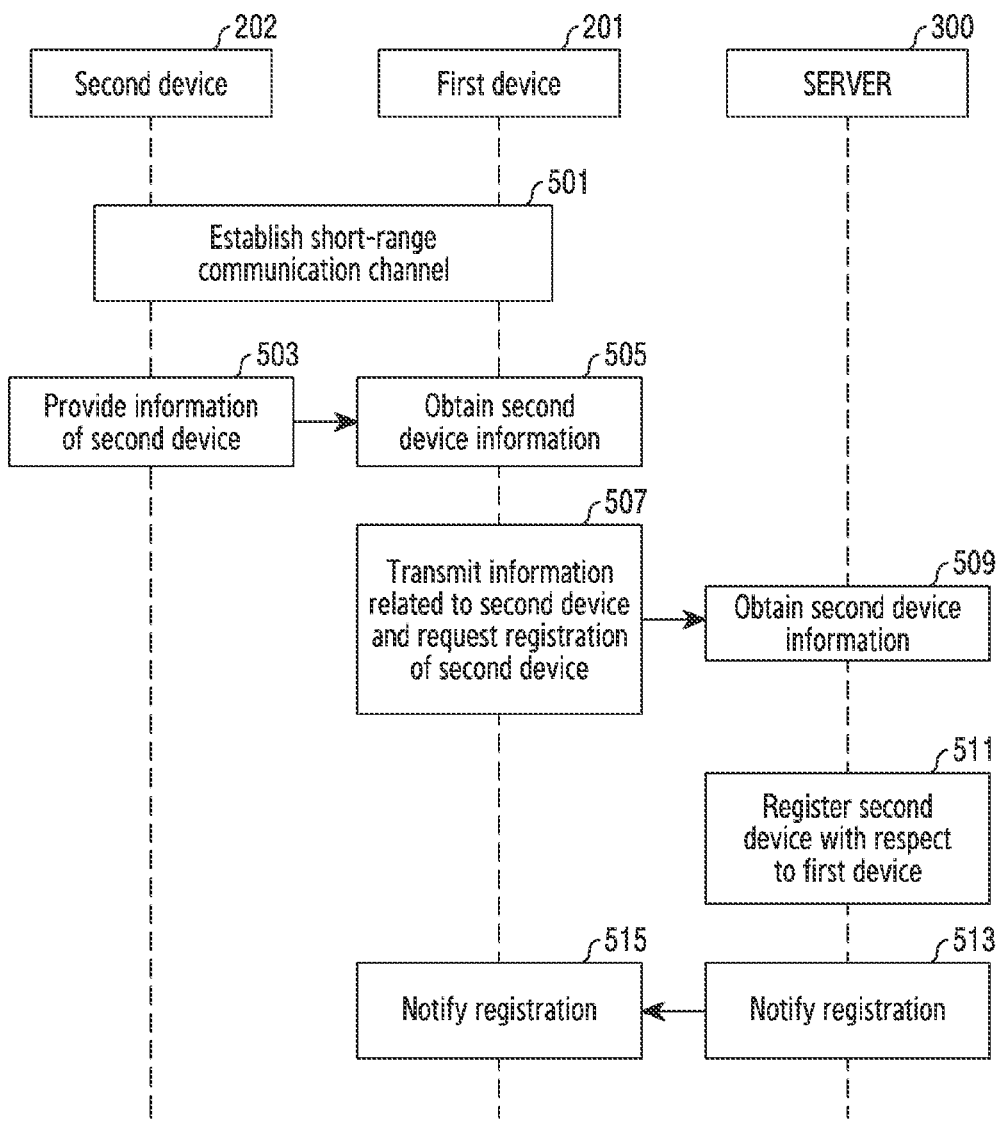
FIG. 5 illustrates a flowchart for a first device to register a second device at a server, according to an embodiment.

FIG. 5 illustrates a flowchart for a first device to register a second device to a server, according to an embodiment.

Referring to FIG. 5, the first device 201 may establish a short-range communication channel with the second device 202 in step 501. For example, the short-range communication channel may be a device-to-device connection such as Bluetooth™ or Wi-Fi direct, but is not limited thereto.

The second device 202 may provide the information of the second device 202 to the first device 201 over the short-range communication channel in step 503. The information of the second device 202 may include the type (e.g., a tag, a smart watch, or a tablet) of the second device 202, unique identification information (e.g., a device ID), a manufacturer of the second device 202, hardware information (e.g., processor performance, memory capacity, and/or battery capacity) of the second device 202, software information (e.g., operating system type and version, installed applications, and/or whether to support the device finding service) of the second device 202, and/or communication performance information (e.g., whether to support BT, BLE, UWB, cellular, Wi-Fi, NFC, and/or magnetic secure transmission (MST)).

The first device 201 may obtain the information of the second device 202 in step 505. The first device 201 may store the obtained information of the second device 202 in a memory (e.g., the memory 130 of FIG. 1) of the first device 201.

The first device 201 may transmit the information of the second device 202 to the server 300 and request registration of the second device 202 in step 507. For example, the first device 201 may transmit a message of a designated type to the server 300. The message of the designated type may include the information of the first device 201, the user information of the first device 201, the registration request of the second device 202, and/or the information of the second device 202. For example, if the first device 201 is registered to the first user account registered in the server 300, the first device 201 may request to register the second device 202 to the second user account, by transmitting the message to the server 300. As another example, if the first device 201 is registered to the first user account registered in the server 300 and the second device 202 is registered to the second user account registered in the server 300, the first device 201 may request to register to a third user account (e.g., a group account) including the first user account and the second user account, or to delete the information of the second device 202 registered to the second user account, and to register the second device 202 to the first user account, by transmitting the message to the server 300.

The server 300 may obtain the information of the second device 202 from the first device 201 in step 509. The server 300 may be connected with the first device 201 over a cellular network or a Wi-Fi network. The server 300 may obtain the information of the second device 202 from the first device 201 over the designated network.

The server 300 may register the second device 202 with respect to the first device 201 in step 511. For example, the account manager 310 of the server 300 may also register the second device 202 with respect to the first user account corresponding to the first device 201 using the information obtained from the first device 201.

The server 300 may transmit to the first device 201 a notification indicating that the second device 202 is registered in step 513. The first device 201 may receive a registration notification from the server 300 in step 515.

It is noted that steps 501 to 515 may be referred as a registration procedure or an onboarding procedure of the second device 202. The registration procedure or the onboarding procedure may include storing the ID of the second device 202 (e.g., a tracker) in the server 300.

If a designated time passes after disconnection from the first device 201, the second device 202 may recognize its lost state and broadcast an advertising packet including its identification information.

Figure 6:
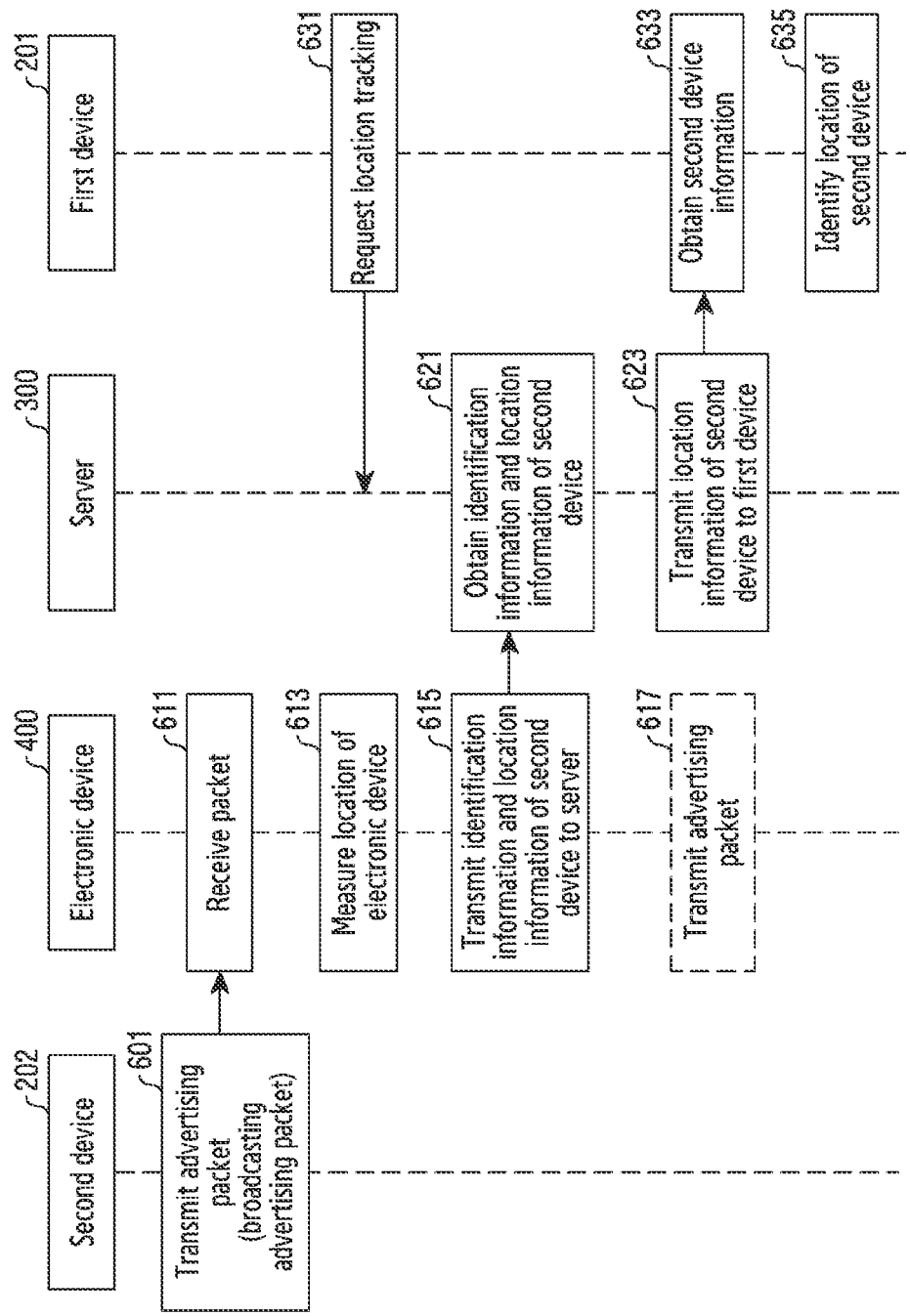
FIG. 6 illustrates a flowchart for tracking a current location of a lost device in a finding system according to an embodiment.

FIG. 6 illustrates a flowchart for tracking a current location of a second device in a finding system according to an embodiment. FIG. 6 illustrates that the first device 201 and the second device 202 are the user devices sharing the same user account in the system of FIG. 2, and the second device 202 is lost. The electronic device 400 is an arbitrary device irrelevant to the user of the first device 201 and may be understood as being located at a distance for receiving a packet broadcast from the second device 202.

In FIG. 6, the second device 202 may broadcast an advertising packet using a designated communication protocol in step 601. The designated communication protocol may correspond to one type of a low-power short-range communication protocol to minimize the battery consumption, such as BLE.

The second device 202 may, if detecting the lost state, broadcast the advertising packet. The condition of determining that the second device 202 is lost may be variously set. Alternatively, the second device 202 may broadcast the advertising packet regardless of detecting the lost state. For example, the second device 202 may repeatedly broadcast the advertising packet at designated intervals (e.g., 1 hour) for a specific time (e.g., 15 minutes). The second device 202 may repeatedly broadcast the advertising packet at designated intervals (e.g., a user set time) for a specific time.

The electronic device 400 may receive an advertising packet broadcast by an external device in step 611. It is assumed herein that the advertising packet broadcast by the second device 202 is received.

The electronic device 400 may include various communication circuits, such as a first wireless communication circuit which supports the short-range communication for receiving the advertising packet and a second wireless communication circuit which supports the long-range communication (e.g., cellular communication) for communicating with the server 300. The electronic device 400 may include a location measurement circuit (e.g., a GPS) for measuring its location.

The location measurement circuit may include, besides a positioning system using satellite navigation such as a GPS, a positioning system using a base station or an access point of Wi-Fi, or a positioning system using an NFC beacon.

Since the advertising packet broadcast by the second device 202 uses the designated short-range communication protocol, receiving the advertising packet may indicate that the second device 202 and the electronic device 400 are within a communication distance permitted in the short-range communication protocol. For example, if the electronic device 400 receives the advertising packet through the BLE, it may be estimated that the electronic device 400 is located within about 100 m from the second device 202. Hence, the location of the electronic device 400 may be treated identically to the location of the second device 202.

The electronic device 400 may measure the location of the electronic device 400 using the location measurement circuit in step 613. The electronic device 400 may identify the location (e.g., latitude and/or longitude coordinates) of the electronic device 400 based on a measurement result.

For example, by controlling the location measurement circuit, the electronic device 400 may receive GPS signals from outside (e.g., three or more satellites). Based on time information included in the GPS signals received from outside, the electronic device 400 may acquire distance information to satellites which transmit the GPS signals, from the electronic device 400. The electronic device 400 may obtain real-time location information of the electronic device 400, from the distance information corresponding to the satellites which transmit the GPS signals based on triangulation.

The electronic device 400 may transmit to the server 300 the measured location information and the identification information of the second device 202 in step 615. For example, the electronic device 400 may transmit to the server 300 a message including the identification information (e.g., a unique ID, and/or a serial number) of the second device 202 and the location information using the above-mentioned second wireless communication circuit. The electronic device 400 may specify that the location information included in the message is the location information of the electronic device 400, but may include merely the location information without specifying the subject of the location information.

The electronic device 400 may broadcast an advertising packet after transmitting the message to the server 300 in step 617. For example, if the advertising packet obtained by the electronic device 400 from the second device 202 is a first a packet and the advertising packet rebroadcast by the electronic device 400 is a second packet, the second packet may include content (data) which is substantially identical to or less than the first packet. For example, a format of the second packet may omit at least some field of a plurality of fields included in a format of the first packet.

The electronic device 400 may broadcast the advertising packet before transmitting the message to the server 300, or substantially concurrently with the transmission. Alternatively, step 617 may not be performed.

In step 621, the server 300 may obtain the message including the identification information and the location information of the second device 202 from the electronic device 400. If receiving a tracking request for the location of the second device 202 from the first device 201 in step 631 before and/or after obtaining the message, the server 300 may transmit the location information of the external device (e.g., the second device 202) to the first device 201 in step 623. For example, the first device 201 may transmit a location tracking (or locating) request for the second device 202 to the server 300 in step 631, and the server 300 may transmit information of the identified location of the second device 202 to the first device 201 in response to the request received from the first device 201. For example, the server 300 may transmit to the first device 201 the location information of the second device 202 identified most recently.

The first device 201 may obtain the location information of the second device 202 from the server 300 in step 633. The first device 201 may locate the second device 202 based on the information obtained from the server 300 in step 635. Steps 631, 633 and/or 635 may be implemented through an application which provides the locating service mounted in the first device 201, as will be described in reference to FIG. 7.

If obtaining the identification information and the location information of the second device 202 from the electronic device 400, in step 621, the server 300 may determine whether a location tracking request in step 631 is received from the first device 201 which registers the second device 202 to the server 300 with the first user account or other device having the first user account. For example, if the location tracking request is not received in step 631 from the first device 201, the server 300 may not perform step 623. The server 300 may transmit a response message to the electronic device 400 based on whether the location tracking request in step 631 is received from the first device 201. For example, if the location tracking request is received in step 631 from the first device 201, the server 300 may transmit to the electronic device 400 the response message informing that the identification information and the location information of the second device 202 are transmitted to the first device 201. If the location tracking request in step 631 is not received from the first device 201, the server 300 may request not to transmit the identification information and the location information of the second device 202 to the electronic device 400 for a designated time. The electronic device 400 may perform step 617 of broadcasting an advertising packet based on the response from the server 300.

Figure 7:
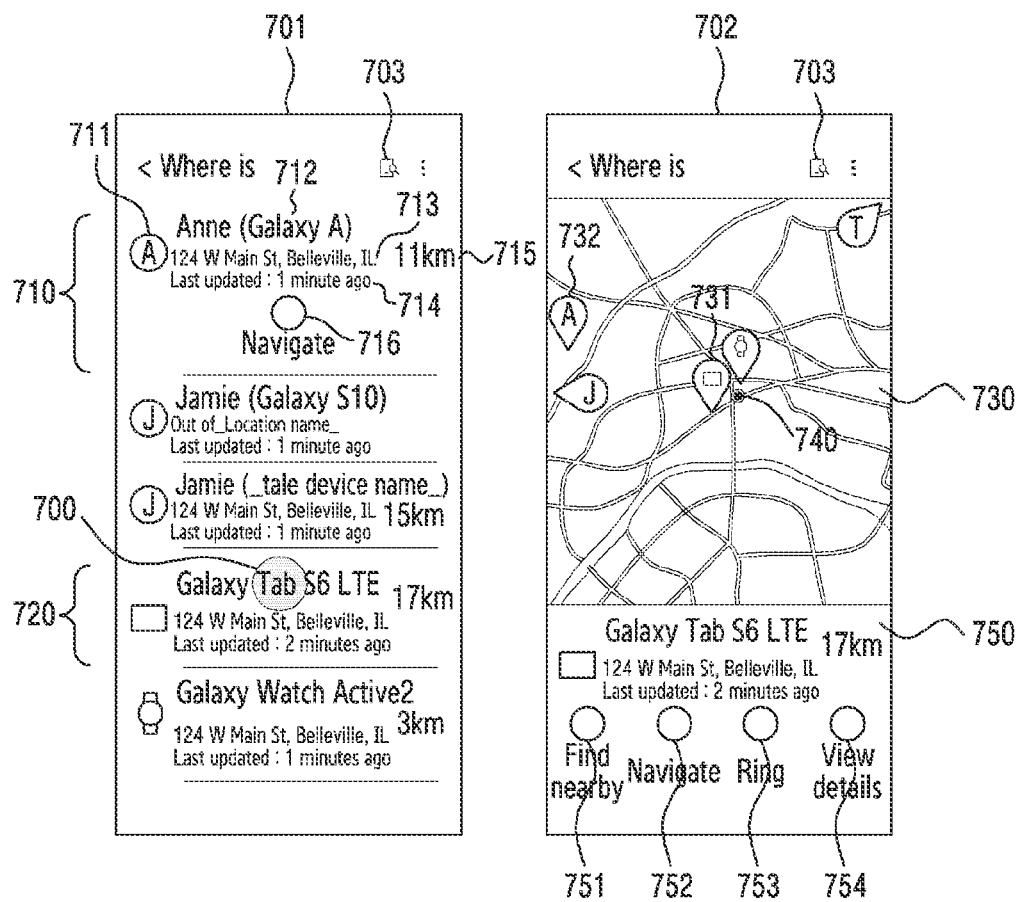
FIG. 7 illustrates a user interface for locating user devices in a first device according to an embodiment.

FIG. 7 illustrates a user interface for locating user devices in a first device according to an embodiment.

Referring to FIG. 7, a first screen 701 may be an application execution screen for providing the locating service of the first device 201. The first device 201 may display information of user devices registered to the first device 201 in a list form. The first screen 701 may present the list including an item corresponding to the first device card 211 and an item corresponding to the second device card 212. For example, the list of the first screen 701 may include a first item 710 corresponding to a smartphone (e.g., Galaxy A) indicating the first device 201 registered in the user account of the first device 201 and a second item 720 corresponding to an arbitrary tablet (e.g., Galaxy Tab S6 LTE) registered in the user account. Hereinafter, descriptions on the first item 710 and/or the second item 720 may be also applied to other items (e.g., Jamie (Galaxy S10), Jamie (_tale device name_), and/or Galaxy Watch Active2) not specified in the first screen 701.

Each item included in the list may include various information. For example, the first item 710 may include at least one of an icon 711 indicating the smartphone, a nickname (e.g., Anne) and a model name Galaxy A 712 of the smartphone, the last location identified 713 (e.g., 124 W Main St, Belleville, IL), a time 714 of the last location identified (e.g., Last updated: 1 minute ago), a distance 715 from the current location of the first device 201 to the smartphone, and a navigation menu 716 for executing a map application or a map function based on the current location of the first device 201 and the last identified location 713. Some of these items may be omitted. For example, if the location of the device is not identified, at least part of the last identified location 713 or the time 714 of the last identified location or the navigation menu 716 may not be displayed.

The first device 201 may automatically perform step 631 if the application is executed. Alternatively, the first device 201 may perform step 631 by a user input after the application is executed, or at designated intervals (e.g., 12 hours), and update the locations of the user devices 200 registered at the first device 201.

If a user input 700 selects the second item 720 among the several items included in the list, the first device 201 may provide a second screen 702 on the display of the first device 201. The second screen 702 may be a UI generated based on the second device card 212.

The second screen 702 may include a map area 730 and a second device card area 750. For example, the map area 730 may be displayed at an upper portion (area) of the second screen 702, and the second device card area 750 may be displayed at a lower portion (area). However, the second device card area 750 may be disposed at a different position from the illustrated example. For example, the second device card area 750 may be presented as floating over the map which occupies most of the second screen 702. In addition, a position or a size of the second device card area 750 may be moved/enlarged/reduced by a user input.

The map area 730 may display the locations of the user devices 200 identified through the server 300. The locations of the user devices 200 may be displayed as icons. For example, the location of the smartphone corresponding to the first item 710 may be displayed on the map as a first icon 732. In addition, the location of the tablet corresponding to the second item 720 selected by the user input 700 may be displayed on the map as a second icon 731. The location of the tablet corresponding to the second item 720 selected by the user input 700 may be displayed at the center of the map area 730. The map area 730 may display a current location 740 of the first device 201, which may be positioned at the center of the map area 730.

The second device card area 750 may include a device action menu 751, a navigation menu 752, a ring menu 753, and/or a view details menu 754.

If the device action menu 751 is selected, the first device 201 may identify whether the second device 202 (e.g., the tablet corresponding to the second item 720) is near the first device 201. For example, if the device action menu 751 is selected, the first device 201 may present and/or update the map area 730 based on the location of the first device 201 and the location information of the user devices 200 received from the server 300. The first device 201 may search for the second device 202 present in vicinity using the designated communication protocol (e.g., BLE) in response to selecting the device action menu 751. If the second device 202 is connected using the designated communication protocol, the first device 201 may drive the AR finder 233 and present the location of the second device 202 through an AR interface, or determine whether to present the location of the second device 202.

If the navigation menu 752 is selected, the first device 201 may display a route to the location of the second device 202 in the map area 730. If the ring menu 753 is selected, the first device 201 may try to make a call to the second device 202 or play a designated sound at the second device 202. For example, if the second device 202 supports the call function, the first device 201 may try to make a call to the second device 202 in response to the selection of the ring menu 753. If the second device 202 is connected with the first device 201 over a designated short-range communication network, the first device 201 may transmit a designated signal to the second device 202 over the short-range communication network in response to the selection of the ring menu 753. The second device 202 receiving the designated signal may notify its location by generating a predefined ring signal (e.g., a ring, vibration and/or flashing) in response to the designated signal.

If the view details menu 754 is selected, the first device 201 may present more detailed information of the second device 202. For example, the first device 201 may display the state of the second device 202 according to various conditions. If the second device 202 is connected to the first device 201 or another device (e.g., the fifth device 205 or the sixth device 206) of the user devices 200, the first device 201 may display a first state message such as "Nearby Finding". The message may be displayed as a popup or displayed in the second device card area 750 of the second device 202. If the second device 202 is not connected to the first device 201 or other device of the user devices 200 but is not in the "Offline Finding" state, the first device 201 may display a second state message such as "Not in Range Finding". Herein, "Offline Finding" state may indicate that the first device 201 is lost, and a threshold time passes after the second device 202 is lastly connected to any one of the user devices 200.

If the second device 202 is not connected to the first device 201 or other device of the user devices 200 and is not in the "Offline Finding" state but finding the second device 202 has been attempted, the first device 201 may display a third state message such as "Lost Mode Finding". If the second device 202 is not connected to the first device 201 or other device of the user devices 200 and is in the "Offline Finding" state, the first device 201 may display a fourth state message such as "Update Mode Finding". If the first device 201 tries to connect the second device 202, a fifth state message such as "Connecting" may be displayed. The first through fifth state messages related to the device action menu 751 may be included in the first device card 211 and/or the second device card 212 of FIG. 3.

The first through fifth state messages stated above are examples, and fewer or more state messages may be properly set by the manufacturer or the user as needed. The first device 201 may provide battery level information of the second device 202. The first device 201 may display the location (location information) of the second device 202 based on a time stamp. The first device 201 may display the current state of the second device 202 using a device card message. For example, the first device 201 may display a message indicating whether the second device 202 is near the first device 201, whether it is near another device (e.g., the fourth device 204) of the user devices 200, the last location of the second device 202, whether the second device 202 is being looked for, or whether the second device 202 is found.

The information presented in the second device card area 750 is not limited to the illustrated example and may be presented with at least one information of the information related to the device action menu 751 and the information (e.g., the battery level information, the location information, and/or the device card message) included in the view details menu 754.

Figure 8:
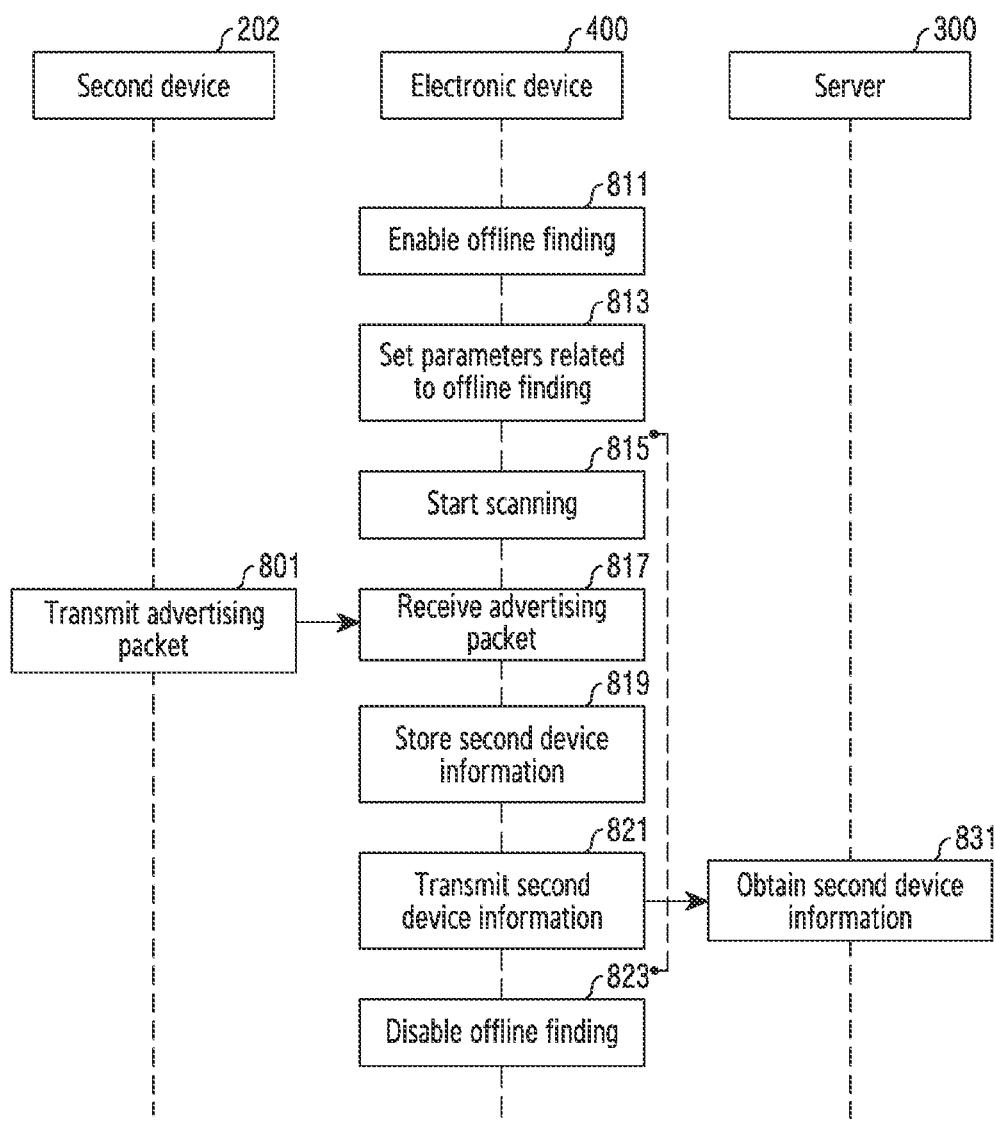
FIG. 8 illustrates a flowchart of an electronic device for performing scanning to find an arbitrary external device according to an embodiment.

FIG. 8 illustrates a flowchart of an electronic device for performing scanning to find an arbitrary external device according to an embodiment.

The electronic device 400 may enable the offline finding in step 811 in the setting menu. Alternatively, the offline finding function may be enabled on a periodic basis, full-time, or in a designated time duration (e.g., 9 AM through 6 PM).

The electronic device 400 may set parameters related to the offline finding, in response to enabling the offline finding function in step 813. For example, parameters such as a scan period and a window, a scan interval, a scan duration time, and/or a wakeup intent may be set. Herein, the scan period may indicate a time of one scanning. The scan window may indicate an actual scanning time, in the scan period. For example, if the scan period is 2000 ms and the scan window is 200 ms, the short-range communication circuit may perform primary scan for 200 ms after wakeup, maintain a sleep state for the remaining 1800 ms, and perform secondary scan for 200 ms at a timing at which 2000 ms passes after the wakeup.

The scan duration time may indicate a time of maintaining the scan with the above-stated scan period. For example, the electronic device 400 may maintain the scan performed every 2000 ms for one hour. The scan interval may indicate an interval between the scan duration times. For example, if the scan duration time is one hour and the scan interval is 4 hours, the electronic device 400 may maintain the scan for 1 hour from the start time 00 AM, maintain the sleep state for three hours, and maintain the scan for one hour from 04 AM after 4 hours passes from the start time 00 AM.

Step 813 may be omitted, in which case the parameter setting related to the offline finding may use designated setting values (e.g., default values).

The electronic device 400 may commence the scan in step 815. The scan of the electronic device 400 may be performed according to a rule defined by the parameters related to the scan which are set in step 813. The electronic device 400 may enable a first communication circuit which supports the short-range communication to acquire an advertising packet obtained from the external device (e.g., the second device 202) during the scan.

The second device 202 may broadcast the advertising packet using the designated short-range communication protocol in step 801. For example, the second device 202 may be broadcasting the advertising packet including the identification information of the second device 202 at specific time intervals using the BLE protocol.

The second device 202 may broadcast the advertising packet according to a network state change. For example, the second device 202 may determine whether the current network is available. For example, if the network connection between the second device 202 and the server 300 or the first device 201 is lost, the second device 202 may determine whether the network disconnection results from an airplane mode. For an application of the second device 202 to identify the current network state, the corresponding application which provides the location finding service may reside in the memory of the second device 202. If not in the airplane mode, the second device 202 may set an alarm, and broadcast the advertising packet if the set alarm time arrives. If the connection with the first device 201 is restored, the second device 202 may cancel the set alarm and stop the operation of broadcasting the advertising packet.

After the scan starts, the electronic device 400 may receive the advertising packet from the second device 202 in step 817. The electronic device 400 may obtain the information of the second device 202 from the information included in the received advertising packet in step 817 and store the obtained information in the memory of the electronic device 400 in step 819.

The electronic device 400 may transmit the information of the second device 202 to the server 300 based on the information received from the second device 202 in step 821. The electronic device 400 may include the information of the second device 202 and location information. Herein, the location information may be the location of the electronic device 400 measured by the location measurement circuit of the electronic device 400. In step 821, the electronic device 400 may obtain from the server 300 an encryption key for encrypting the information transmitted to the server 300 to improve security, encrypt the information of the second device 202 with the obtained encryption key, and transmit the encrypted information to the server 300. For example, the electronic device 400 may transmit at least part of the information of the second device 202 to the server 300, obtain the encryption key from the server 300, and then encrypt the information of the second device 202 and/or the location information with the obtained encryption key and transmit the information to the server 300.

The server 300 may obtain the information of the second device 202 and/or the location information from the electronic device 400 in step 831 and provide the location information of the second device 202 to the first device 201 in response to a request to the first device 201 (e.g., step 623 of FIG. 6).

The electronic device 400 may repeat steps 815, 817, 819, and/or 821 for a specific time for the scan duration time, and disable the offline finding function in step 823 if the scan duration time ends. Alternatively, the offline finding function may be disabled by various events such as a user input or a battery level state of the electronic device 400.

Figure 9:
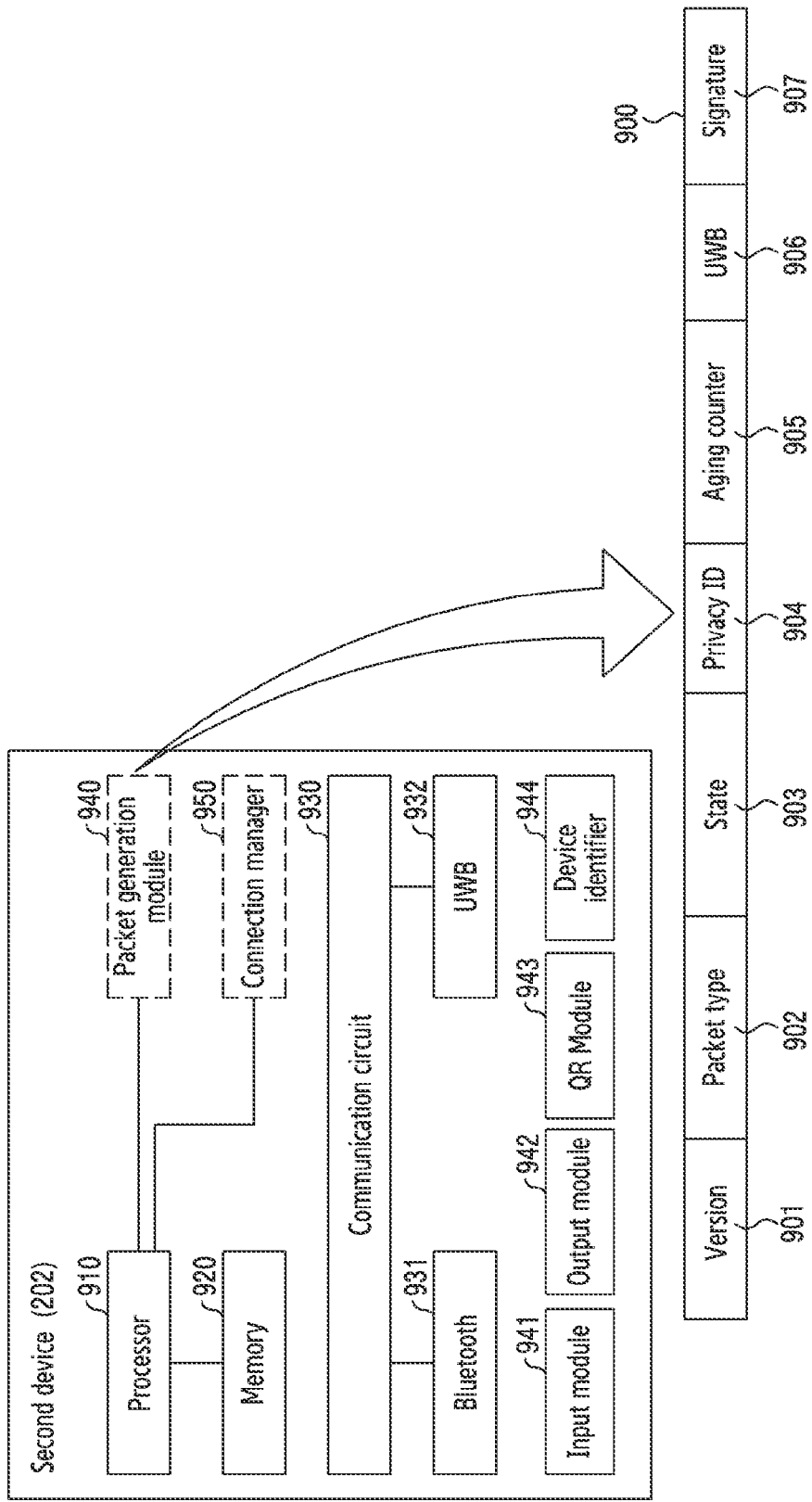
FIG. 9 illustrates a configuration of a second device and a data structure of a packet broadcast by the second device according to an embodiment.

FIG. 9 illustrates a configuration of a second device and a data structure of a packet broadcast by the second device according to an embodiment.

Referring to FIG. 9, the second device 202 may include at least one processor 910, a memory 920, and a communication circuit 930. The components of the second device 202 shown in FIG. 9 are examples, and the components described with reference to FIG. 1 may be adequately applied to the second device 202. In addition, the explanations of FIG. 1 may be applied to components corresponding to FIG. 1 among the components of FIG. 9.

The at least one processor 910 may execute a command from the memory 920, and implement a packet generation module 940 and/or a connection manager 950. The packet generation module 940 and the connection manager 950 may be understood as software modules implemented by executing program code stored in the memory 920. In addition, it shall be understood that an operation performed by the packet generation module 940 or the connection manager 950 is performed by the processor 910 in the following description.

Referring to FIG. 9, the at least one processor 910 may drive the packet generation module 940 by executing commands stored in the memory 920. The packet generation module 940 may generate an advertising packet 900 including the information of the second device 202. The at least one processor 910 may provide the generated advertising packet 900 to the communication circuit 930, through (using) the connection manager 950, and the communication circuit 930 may broadcast the advertising packet 900 using the designated protocol. The communication circuit 900 may support the short-range communication protocols of Bluetooth™ 931 and UWB 932.

If a wireless communication connection with the first device 201 or the electronic device 400 is set through the communication circuit 930, the at least one processor 910 may control the packet generation module 940 to change information of its connection state. For example, the at least one processor 910 may set and change the state information to indicate whether there is an available channel in the second device 202 or which channel is available. The at least one processor 910 may generate the advertising packet 900 including the state information through the packet generation module 940 and provide the generated advertising packet 900 to the communication circuit 930.

The advertising packet 900 may include version 901, packet type 902, connection state 903, privacy ID 904, aging counter 905, UWB 906, and/or signature 907 fields.

The version 901 may indicate a version of the advertising packet. Since the advertising packet needs to rely on a rule shared between the second device 202 which broadcasts the advertising packet and the electronic device 400 which receives and interprets the advertising packet, the version of the advertising packet may be used to determine a rule for the electronic device 400 receiving it to interpret data included in the advertising packet. For example, if receiving the advertising packet of an older version rather than the latest version, the electronic device 400 may interpret the advertising packet according to a rule corresponding to the old version. As another example, if a version of the electronic device 400 is lower than the version of the advertising packet, the electronic device 400 may update the version through a server (e.g., the server 108 of FIG. 1).

The packet type 902 may indicate whether the advertising packet is to deliver information, or to request information. For example, if the second device 202 broadcasts the advertising packet in order to deliver its information, the packet type 902 may indicate normal advertisement. If the second device 202 broadcasts the advertising packet in order to obtain information from the first device 201 or the server 300, the packet type 902 may be set to indicate request advertisement.

The connection state 903 may indicate information related to whether the second device 202 is currently in an offline mode (e.g., offline finding) or an online mode. If the second device 202 is currently in the online mode, the connection state 903 may indicate that the second device 202 is in the connected state with the first device 201, and information of which channel maintains the connection. For example, the connection state 903 may be defined by distinguishing whether the channel connected by the second device 202 in the online mode is the normal channel, the reserved channel, or both channels are used. If the second device 202 is currently in the offline mode, the connection state 903 may be defined to indicate information that the second device 202 is in the offline state disconnected from the first device 201, and the amount of time that passes after the disconnection. For example, the offline mode may be divided to premature offline, offline and overmature offline depending on the time passed after the disconnection of the second device 202.

The privacy ID 904 may be unique identification information of the second device 202. Additionally and/or alternatively, the privacy ID 904 may be a random ID generated according to a designated algorithm based on the unique identification information of the second device 202. If the privacy ID 904 of the second device 202 is not changed, a privacy problem that the location is unintentionally tracked by another nearby device which recognizes the privacy ID 904 may occur, and accordingly, the privacy ID 904 may be changed at designated time intervals (e.g., 15 minutes).

The aging counter 905 may indicate the number of changes of the privacy ID 904 after the second device 202 is onboard. For example, if the second device 202 changes the privacy ID 904 at intervals of 15 minutes, the aging counter 905 may increase at intervals of 15 minutes based on a server time (epoch time) stored at the onboarding timing. The change of the privacy ID 904 and the increase of the aging counter 905 may be performed at the same time.

The UWB 906 may indicate whether the second device 202 supports the UWB communication. The advertising packet 900 may further include, besides the UWB, information indicating whether the second device 202 supports E2E, or MCF.

The signature 907 is a digital signature value generated using the private key of the second device 202 and may indicate whether a corresponding advertising packet is valid. The signature 907 may be calculated in real time at every advertising packet transmission and added to the field of the advertising packet.

The second device 202 may further include an input module 941, an output module 942, a QR code 943 and a device identifier 944. The input module 941 identifies a user's intent and may be in the form of a physical button. For example, if an alarm occurs at the second device 202, the user may stop the alarm by clicking a button provided in the second device 202. The output module 942 generates an audio signal and may include a buzzer-type device. The QR code 943 performs procedures such as identification, registration and/or onboarding of the second device 202 and may be printed on the second device 202 or on a separate sticker and attached to the second device 202. The device identifier 944 is unique identification information assigned for the second device 202 and may include a product serial number or a short-range communication media access control (MAC) address of the second device 202.

Figure 10:
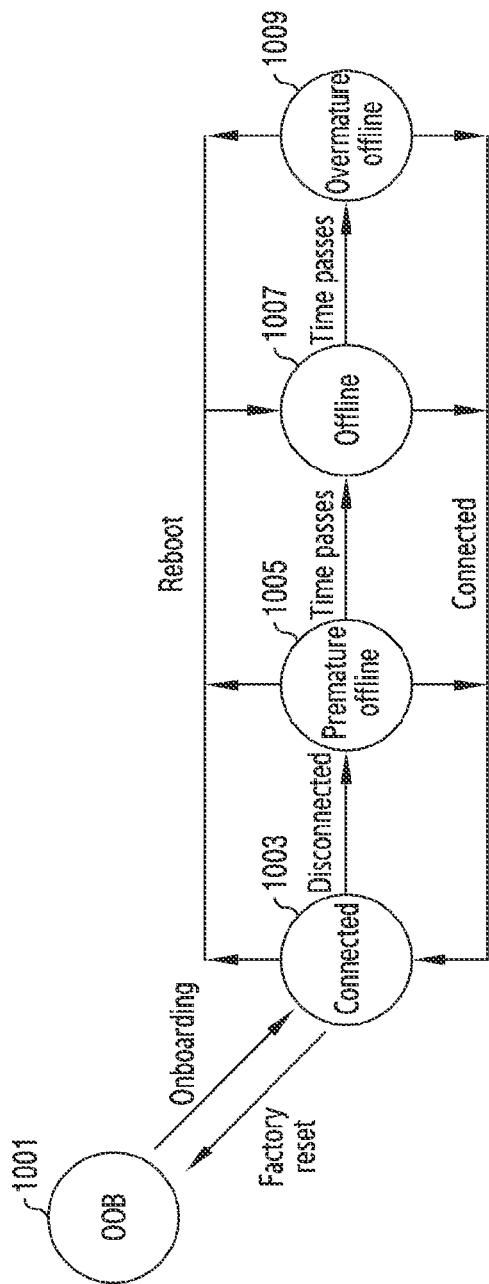
FIG. 10 illustrates a state determination criterion of a second device according to an embodiment.

FIG. 10 illustrates a state determination criterion of a second device according to an embodiment.

Referring to FIG. 10, the second device 202 may change the state to out of box (OOB) 1001, connected state 1003, premature offline state 1005, offline state 1007, or overmature offline state 1009 according to the system setting, connection or disconnection with the first device 201 and/or the time passed after the disconnection.

The OOB 1001 may indicate a state before system setup is finished after a product box of the second device 202 is initially opened. The second device 202 in the OOB 1001 state may be connected with the first device 201 through the onboarding procedure, and registered to the server 300. The second device 202 may switch back to the OOB 1001 state through factory reset even though the system setup is finished.

The connected 1003 may indicate that the second device 202 is connected by setting the short-range communication channel with the first device 201. The second device 202 may identify the first device 201 using the public key registered at the server 300 in the onboarding procedure and set the connection. For example, the second device 202 in the connected state 1003 state may communicate with the first device 201 based on a generic attribute profile (GATT) connection. In addition, if the connection with the first device 201 is set in the premature offline state 1005, the offline state 1007 and the overmature offline state 1009, the second device 202 may immediately transition to the connected state 1003.

The premature offline state 1005 may indicate a state before the first time (e.g., 15 minutes) passes after the second device 202 is disconnected from the first device 201. The second device 202 may maintain the premature offline state 1005 during the first time, without immediately switching to the offline state 1007 state right after the disconnection from the first device 201.

The offline state 1007 may indicate a state after the first time passes after the second device 202 is disconnected from the first device 201. The second device 202 may enter the premature offline state 1005 state and then switch to the offline state 1007 state if the first time (e.g., 15 minutes) passes, and then maintain the offline state 1007 state until the second time (e.g., 24 hours) further passes. If the starting system is rebooted in the connected state 1003, the premature offline state 1005 and the overmature offline state 1009 state, the second device 202 may transit to the offline state 1007 state. The first time and the second time may adopt various determination criteria by user setting or manufacture standard.

The overmature offline state 1009 may indicate a state after the second time (e.g., 24 hours) passes after the second device 202 enters the offline state 1007 state. The second device 202 in the overmature offline state 1009 may determine that it is lost and broadcast the advertising packet including the identification information of the second device 202 to electronic devices located within a designated distance.

Figure 11:
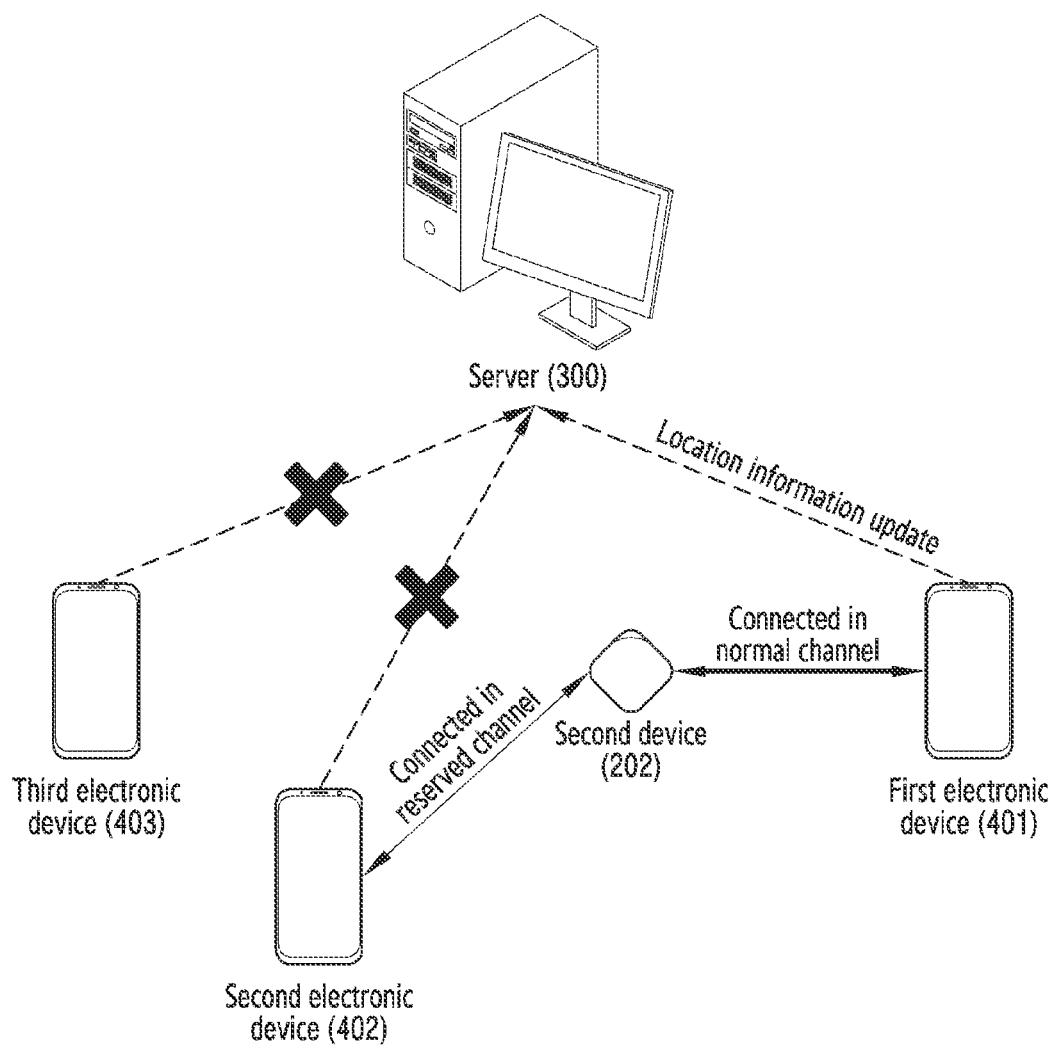
FIG. 11 illustrates a conceptual diagram of a wireless network connection management scheme of a second device according to an embodiment.

FIG. 11 illustrates a conceptual diagram of a wireless network connection management scheme of a second device according to an embodiment. The aforementioned descriptions of the electronic device 400 may be applied to a first electronic device 401, a second electronic device 402 and a third electronic device 403. In addition, the descriptions of the electronic device 101 of FIG. 1 and the first device 201 of the user devices 200 may be also applied to the first through third electronic devices 401, 402, and 403.

Referring to FIG. 11, the second device 202 may broadcast a first signal including its identification information and state information using a wireless communication circuit (e.g., the communication circuit 930 of FIG. 9). The first signal may be understood as a message or a packet (e.g., the advertising packet 900 of FIG. 9) broadcast by the second device 202 if necessary (e.g., if entering the overmature offline state or satisfying a condition set by the user). The first signal may be obtained by one or more electronic devices located within a designated communication distance (e.g., a BLE range) from the second device 202.

In FIG. 11, the first through third electronic devices 401, 402, and 403 may be for inter-operating with the second device 202 among nearby electronic devices which obtain the first signal broadcast by the second device 202. For example, the first through third electronic devices 401, 402, and 403 may be understood as the mother terminal of the second device 202, the terminal registered with the same user/group account, or the terminal identified to be reliable through service authentication.

The first electronic device 401 may identify the channel connection state of the second device 202 based on the first signal obtained. For example, if it is identified that the second device 202 is not connected with other electronic device over the normal channel, the first electronic device 401 may measure the location using at least one sensor, and update the location information of the second device 202 to the server 300. The normal channel may be for the second device 202 to transmit and receive data while continuously maintaining the connection with the external device. If the first electronic device 401 receives the first signal, the location at a close distance from the second device 202 may be estimated, and accordingly, the location measured using at least one sensor in the first electronic device 401 may be treated identically to the location of the second device 202.

The first electronic device 401 may request wireless connection with the second device 202 according to the channel state identified based on the first signal. For example, if no connection of the normal channel of the second device 202 is identified, it may be estimated that the second device 202 is not controlled by a designated terminal, and accordingly, the first electronic device 401 may set the connection with the second device 202 using the normal channel.

The first electronic device 401 may set the connection with the second device 202 over the normal channel, and then set the maximum allowed connections or whether to allow additional connection with respect to the second device 202. For example, the first electronic device 401 may obtain the history information of the second device 202 from the server 300, and identify whether there is at least one other electronic device connected with the second device 202 for a designated time based on the obtained history information. If there is no at least one other electronic device connected with the second device 202 for the designated time, the first electronic device 401 may determine the addition connection with the second device 202 to be unnecessary, and set the maximum allowed connections to 1. In this case, since the reserved channel use of the second device 202 is not permitted, the second device 202 may not further perform the operation of broadcasting the signal including its identification information and connection state information.

If there is at least one other electronic device connected with the second device 202 for the designated time according to the identifying result, the first electronic device 401 may determine that addition connection for the second device 202 is necessary and set the maximum allowed connections to be at least 2. In this case, the second device 202 may change its connection state and then include and broadcast the changed connection state information in the second signal. For example, the second device 202 may change the state information to indicate that the normal channel is connected, and broadcast the second signal including the changed state information. Other nearby electronic devices receiving the second signal may at least temporarily control the second device 202 by setting the connection with the second device 202 over the reserved channel. The first electronic device 401 may set the maximum allowed connections or whether to allow the additional connection based on the battery state of the second device obtained from the second device 202.

The second electronic device 402 may identify the channel connection state of the second device 202 based on the second signal. For example, if it is identified that the normal channel of the second device 202 is connected, the second electronic device 402 may determine that the second device 202 is controlled by the other electronic device and may not update the location information of the second device 202 to the server 300.

The second electronic device 402 may request the wireless connection with the second device 202 according to the channel connection state identified based on the second signal. For example, if the second device 202 is connected with another electronic device over the normal channel, the second electronic device 402 may set the connection with the second device 202 using the reserved channel. The reserved channel which allows the connection setup for a designated time, may be the channel for at least temporarily delivering the control information to the second device 202. While connecting with the second device 202 using the reserved channel, the second electronic device 402 may deliver a control command (e.g., an operation control request or an information request) for the second device 202 over the reserved channel. If the control command is not delivered from the second electronic device 402 in the reserved channel over the designated time, the reserved channel may be automatically terminated to break the connection between the second electronic device 402 and the second device 202. The timing of terminating the reserved channel is not limited thereto and may be configured in various manners according to manufacturer's or user's setting.

If connecting with the second electronic device 402 using the reserved channel while maintaining the connection with the first electronic device 401 over the normal channel, the second device 202 may broadcast a third signal including the changed state information. For example, the second device 202 may change the state information to indicate that both the normal channel and the reserved channel are connected, and broadcast the third signal by including the changed state information. If both the normal channel and the reserved channel are connected, the second device 202 may not broadcast the third signal. In this case, the second device 202 may, if receiving an additional channel connection request or a control request from a nearby terminal, transmit a signal including the changed state information to a corresponding terminal.

The third electronic device 403 may scan the changed state information from the second device 202, and thus identify that both the normal channel and the reserved channel of the second device 202 are connected. For example, the third electronic device 403 may determine that the second device 202 is controlled by another nearby electronic device based on the identified channel connection state and may not update the location information of the second device 202 to the server 300.

Figure 12A:
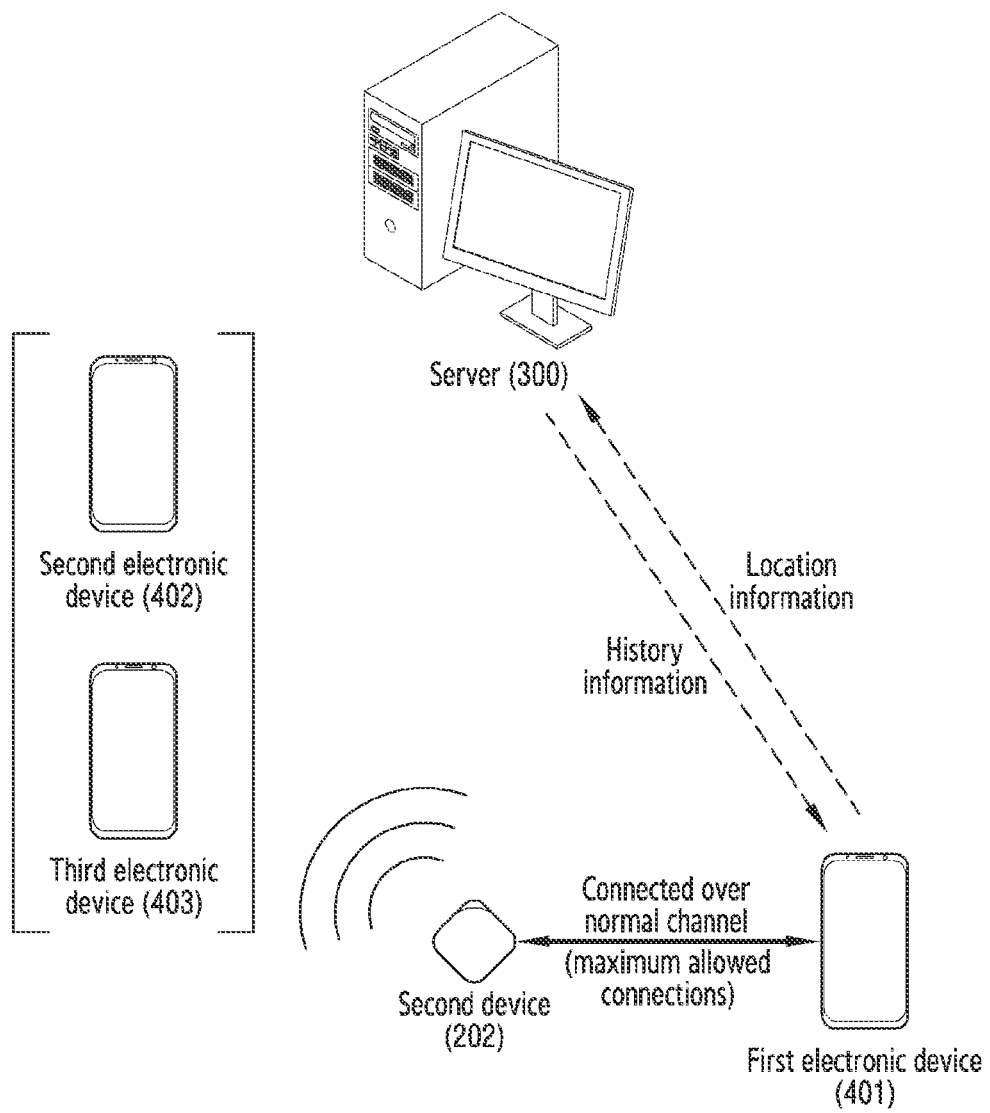
FIGS. 12A and 12B illustrate an operation difference performed based on connection setting of a second device according to an embodiment.
Figure 12B:
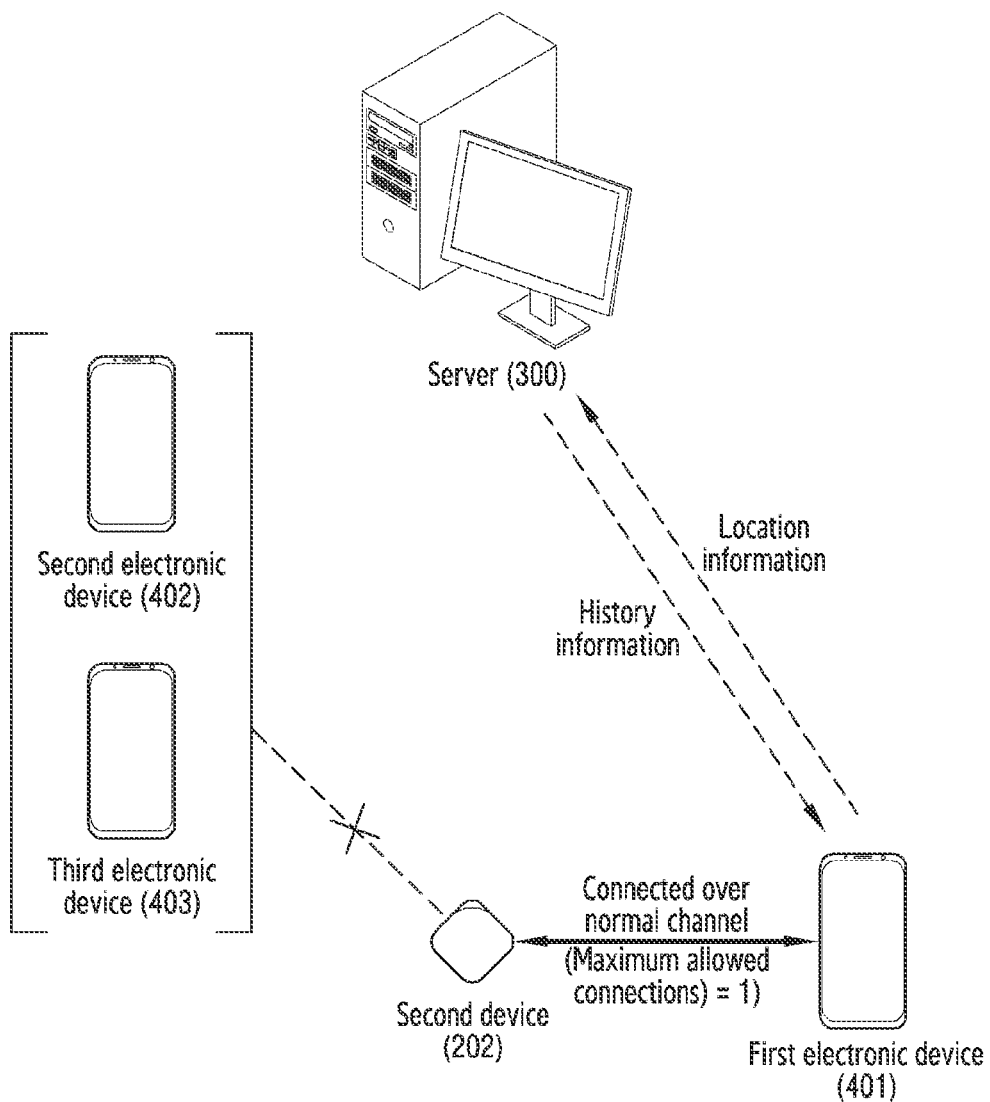

FIGS. 12A and 12B illustrate an operation difference performed based on connection setting of a second device according to an embodiment.

The electronic device 400 may set the maximum allowed connections for the second device 202. The electronic device 400 may be the mother terminal of the second device, the terminal registered with the same user/group account, or the terminal (e.g., the first device 201 of FIG. 2, the electronic device 400 or the first through third electronic device 401, 402, and 403 of FIG. 11) identified to be reliable through the service authentication. The electronic device 400 may correspond to any one electronic device of the first through third electronic devices 401, 402, and 403 shown in FIG. 12A or FIG. 12B.

While performing the onboarding procedure which registers the second device 202 to the server 300 with its related user account, the electronic device 400 may determine the maximum allowed connections of the second device 202 by identifying the number of other electronic devices registered in the same user account. For example, if no other electronic device is registered in the user account of the electronic device 400, the electronic device 400 may determine the maximum allowed connections of the second device 202 to be 1. In this case, the second device 202 may set only connection with one external device using the normal channel and limit additional connection settings using the reserved channel. If it is identified that one or more other electronic devices are registered in the user account of the electronic device 400, the electronic device 400 may determine the maximum allowed connections of the second device 202 to be at least 2. In this case, the second device 202 may set connections with a plurality of external devices and set addition connection with another nearby external device over the reserved channel while maintaining the connection with any one external device using the normal channel.

The maximum allowed connections of the second device 202 may also be set by a device connected with the second device 202. Referring to FIG. 12A and FIG. 12B, the first electronic device 401 may set the connection with the second device 202 using the normal channel. If it is identified that the normal channel of the second device 202 is available based on the signal broadcast by the second device 202, the first electronic device 401 may set the connection with the second device 202 over the normal channel. If setting the connection with the second device 202 over the normal channel, the first electronic device 401 may transmit the location information of the second device 202 to the server 300 at designated time intervals (e.g., 30 minutes or 1 hour). In response to the transmission of the location information, the first electronic device 401 may obtain the history information of the second device 202 from the server

300. The first electronic device 401 may transmit to the server 300 a signal requesting the history information of the second device 202 and obtain the history information in response to the signal. The history may include location information history of the second device 202, the number of other electronic devices connected with the second device 202 for a designated time (e.g., a day or a week), or device information of the other electronic device. The first electronic device 401 may identify whether there is at least one other electronic device connected with the second device 202 for the designated time based on the history, and determine the maximum allowed connections of the second device 202 according to the identifying result.

For example, if the presence of at least one other electronic device connected with the second device 202 for the designated time is identified, the first electronic device 401 may determine the maximum allowed connections of the second device 202 to be greater than 1 as shown in FIG. 12A. The first electronic device 401 may transmit setting information including the determined maximum allowed connections to the second device 202 over the normal channel Referring to FIG. 12A, the second device 202 may change the state information to indicate that the normal channel is connected, and broadcast a signal including the changed state information. Other nearby electronic devices (e.g., the second electronic device 402, the third electronic device 403) receiving the signal broadcast by the second device 202 may identify the connection state of the second device 202 based on the signal and use the reserved channel allowing the connection setup for a designated time to control the second device 202.

Alternatively, if there is no other electronic device connected with the second device 202 for the designated time, the first electronic device 401 may determine the maximum allowed connections for the second device 202 to be 1 as shown in FIG. 12B. If the maximum allowed connections of the second device 202 are determined to be 1, the first electronic device 401 may determine not to further perform the broadcasting operation for the second device 202. The first electronic device 401 may transmit the setting information including the determined maximum allowed connections or whether to perform the broadcasting operation to the second device 202 over the normal channel Referring to FIG. 12B, the second device 202 does not broadcast the signal including its state information based on the setting information, and thus additional connection with another nearby electronic device may be limited.

The first electronic device 401 may determine the maximum allowed connections of the second device 202 based on the battery state of the second device 202. The first electronic device 401 may obtain information related to the battery state from the second device 202 in the normal channel connection, or obtain the battery state information from the server 300 after the normal channel connection. If the battery state of the second device 202 is over a designated level, the first electronic device 401 may set the maximum allowed connections to be greater than 1 to thus allow additional connection with another electronic device. If the battery state is below the designated level, the maximum allowed connections may be set to 1 to thus limit additional connection with another electronic device. If the additional connection is limited, the second device 202 may not further perform the operation of broadcasting the signal including its identification information and connection state information, thus preventing unnecessary battery consumption of the second device 202.

Figure 13:
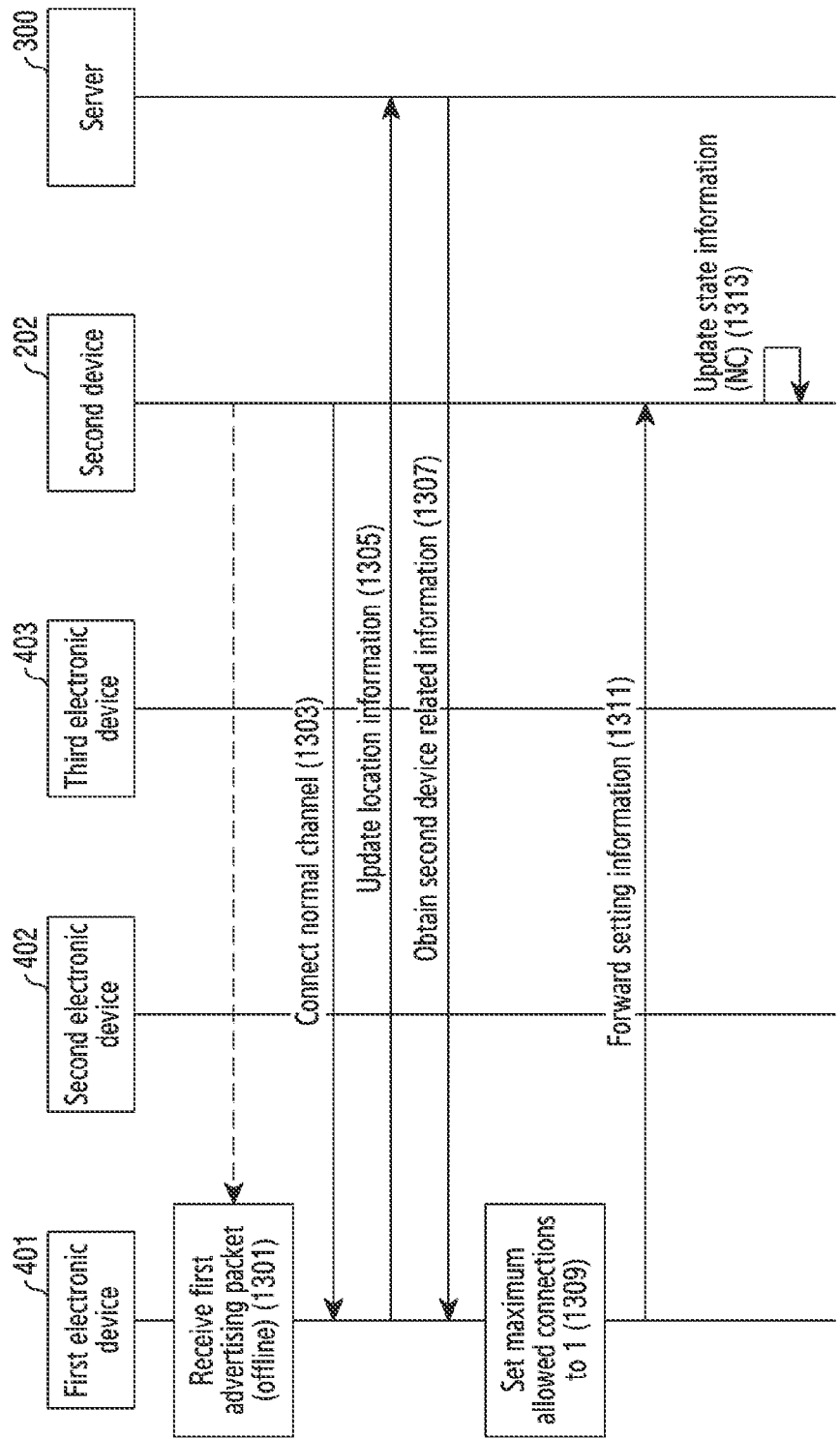
FIG. 13 illustrates a flowchart for setting to disallow additional connection for a second device in an electronic device according to an embodiment.

FIG. 13 illustrates a flowchart for setting to disallow additional connection for a second device in an electronic device according to an embodiment.

Referring to FIG. 13, the first electronic device 401 may receive a first advertising packet broadcast by the second device 202 in step 1301. The first advertising packet may include state information indicating that the second device 202 is offline. For example, the first electronic device 401 may identify that neither the normal channel nor the reserved channel of the second device 200 are connected based on the state information. The normal channel may be for transmitting and receiving data while continuously maintaining the connection in the environment where the second device 202 is connectable with other electronic devices, and the reserved channel may be for at least temporarily delivering the control information by setting the connection for a designated time.

The first electronic device 401 may set the connection with the second device 202 using the normal channel in step 1303. The electronic device 401 may transmit and receive data by inter-operating with the second device 202 while maintaining the normal channel.

The first electronic device 401 may update the location information of the second device 202 registered at the server 300 in step 1305 by transmitting the location information of the second device 202 to the server 300 and obtain second device related information from the server 300 in response to the transmission of the location information in step 1307. Steps 1305 to 1307 may be periodically performed at every designated time (e.g., 30 minutes or 1 hour). The second device related information may include at least one of the connection history, the location information history, or the battery state of the second device 202. The first electronic device 401 may identify the battery state of the second device 202 based on the first advertising packet received from the second device 202 in step 1301 or may identify the battery state of the second device 202 in the normal channel setting with the second device 202 in step 1303. The first electronic device 401 may transmit a signal requesting the second device related information to the server 300 in step 1305 and obtain the second device related information in response to the signal in step 1307.

The first electronic device 401 may determine the maximum allowed connections of the second device 202 to be 1 based on the second device related information. For example, if it is identified that there is no other electronic device connected with the second device 202 for the designated time based on the second device related information, the first electronic device 401 may determine no need for additional connection for the second device 202 and thus determine the maximum allowed connections to be 1. If it is identified that the battery state of the second device 202 falls below the designated level based on the second device related information, the first electronic device 401 may determine the maximum allowed connections to be 1 to prevent unnecessary battery consumption of the second device 202. If the maximum allowed connections of the second device 202 is determined to be 1, the first electronic device 401 may determine not to further perform the operation of broadcasting the advertising packet for the second device 202 in step 1309.

The first electronic device 401 may transmit to the second device 202 setting information including the determined maximum allowed connections and/or data indicating not to perform the broadcasting in step 1311. The first electronic device 401 may access a second device setting menu in the connected state with the second device 202 and allow the user to directly set the maximum allowed connections through the second device setting menu.

The second device 202 may update the state information indicating its channel connection state in step 1313. For example, the second device 202 may change the state information to indicate that the normal channel (NC) is connected. The second device 202 may identify that additional connection with other electronic device is not allowed based on the setting information received from the first electronic device 401, and may not broadcast the advertising packet including the changed state information.

Figure 14:
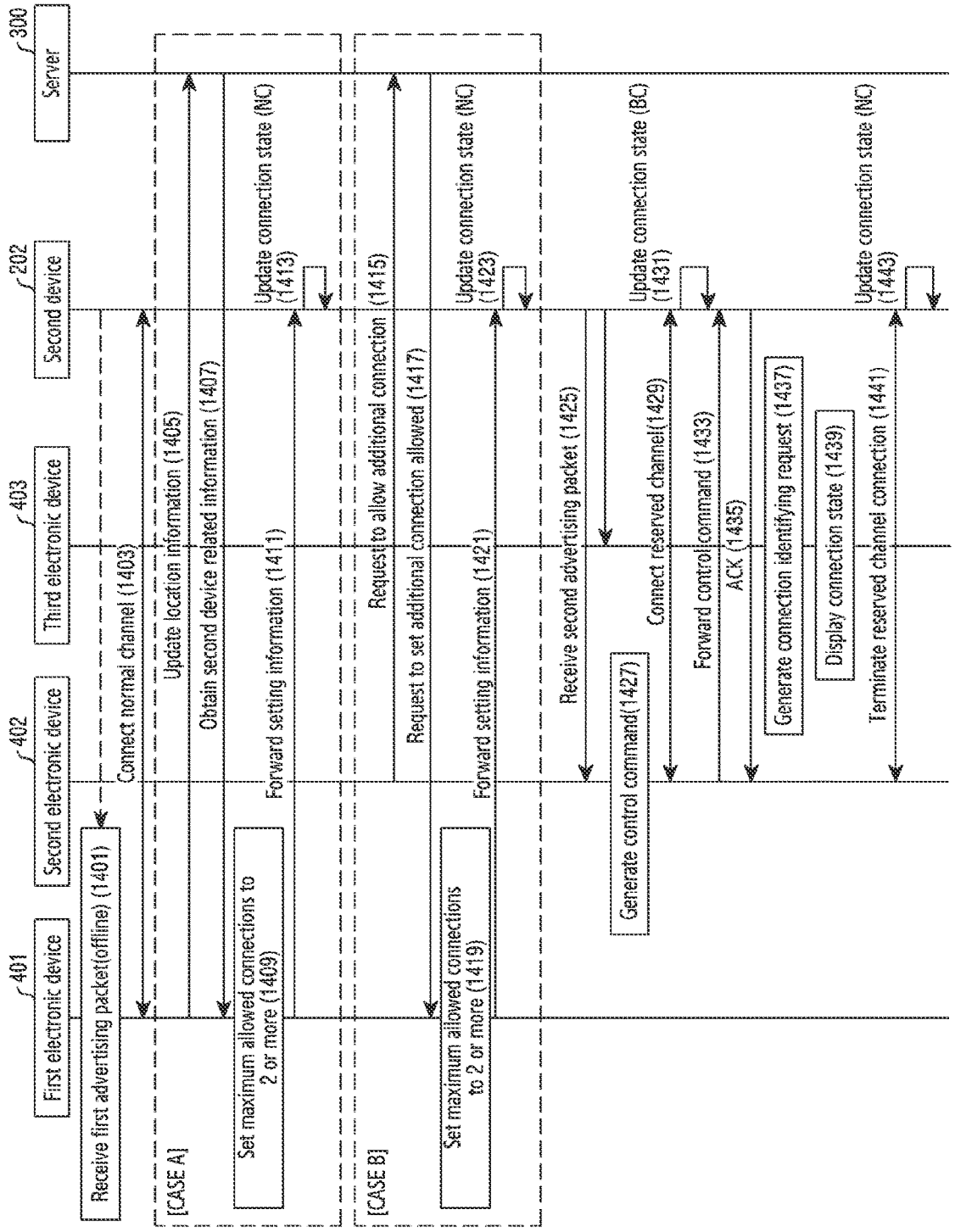
FIG. 14 illustrates a flowchart for setting to allow additional connection for a second device in an electronic device according to an embodiment.

FIG. 14 illustrates a flowchart for setting to allow additional connection for a second device in an electronic device according to an embodiment.

Referring to FIG. 14, the first electronic device 401 may receive the first advertising packet broadcast by the second device 202 in step 1401. The first advertising packet may include the state information indicating that the second device 202 is offline.

The first electronic device 401 may set the connection with the second device 202 using the normal channel, in step 1403. The first electronic device 401 may transmit and receive data by inter-operating with the second device 202 while maintaining the normal channel.

The first electronic device 401 may determine to allow additional connection for the second device 202 based on the information of the second 0device or a request of another electronic device. Operations of the first electronic device 401 may be divided into CASE A (steps 1405 to 1413) or CASE B (steps 1415 to 1423) depending on the information (or the signal) referred to in determining whether to allow the additional connection of the second device 202.

If the second device information is obtained, the electronic device 401 may perform steps 1405 to 1413 corresponding to CASE A. The first electronic device 401 may update the location information of the second device 202 registered to the server 300 in step 1405 by transmitting the location information of the second device 202 to the server 300 and obtain the second device related information from the server 300 in response to the transmission of the location information in step 1407. The second device related information may include at least one of the connection history, the location information history, or the battery state of the second device 202. The first electronic device 401 may transmit a signal requesting the second device related information to the server 300 in step 1405 and obtain the second device related information in response to the signal in step 1407. The first electronic device 401 may identify the battery state of the second device 202 based on the first advertising packet received from the second device 202 in step 1401 or identify the battery state of the second device 202 in the normal channel setting with the second device 202 in step 1403. The first electronic device 401 may determine the maximum allowed connections of the second device 202 to be at least 2 based on the second device related information in step 1409. For example, if it is identified that there is at least one other electronic device connected with the second device 202 for the designated time based on the second device related information, the first electronic device 401 may determine that additional connection for the second device 202 may be necessary and thus determine the maximum allowed connections to be at least 2.

Alternatively, if it is identified that the battery state of the second device 202 is greater than or equal to the designated level based on the second device related information, the first electronic device 401 may determine the maximum allowed connections to be at least 2. If the maximum allowed connections of the second device 202 is determined to be at least 2, the first electronic device 401 may determine to continue the operation of broadcasting the advertising packet for the second device 202 in step 1409. The first electronic device 401 may transmit to the second device 202 the setting information including the determined maximum allowed connections and/or data indicating to perform the broadcasting in step 1411. The first electronic device 401 may access the second device setting menu, and thus allow the user to directly set the maximum allowed connections through the second device setting menu. The second device 202 may update the state information indicating its channel connection state in step 1413. For example, the second device 202 may change the state information to indicate that the normal channel is connected. Steps 1405 to 1413 corresponding to CASE A may be repeatedly performed at designated time intervals while the first electronic device 401 maintains the connection with the second device 202 over the normal channel.

If a connection request for the second device 202 is received from other electronic device, the electronic device 401 may perform steps 1415 to 1423 corresponding to CASE B. The second electronic device 402 may transmit the connection request for the second device 202 to the server 300 in step 1415. The second electronic device 402 is located at a designated distance from the second device 202, and may transmit the connection request for the second device 202 to the server 300 if the channel connection setting with the second device 202 fails. The server 300 may transmit to the first electronic device 401 a signal indicating the additional connection request for the second device 202 from the second electronic device 402 in step 1417. The first electronic device 401 may identify presence of another electronic device requesting the additional connection for the second device 202 based on the signal received from the server 300, and determine the maximum allowed connections to be at least 2 in step 1419. If the maximum allowed connections of the second device 202 are determined to be at least 2, the first electronic device 401 may determine to continue the operation of broadcasting the advertising packet for the second device 202 in step 1419. The first electronic device 401 may transmit to the second device 202 the setting information including the determined maximum allowed connections and/or data indicating to perform the broadcasting in step 1421. The second device 202 may update the state information to indicate that the normal channel (NC) is connected in step 1423.

The second device 202 may broadcast the updated state information by adding it to a field of a second advertising packet (e.g., the state 903 of FIG. 9) in step 1425. The second electronic device 402 and the third electronic device 403 may receive the second advertising packet broadcast by the second device 202. If it is identified that the normal channel of the second device 202 is connected based on the second advertising packet, the second electronic device 402 and the third electronic device 403 may determine that the second device 202 is controlled by the other nearby electronic device and may not update the location information of the second device 202 to the server 300. Hence, the second electronic device 402 and the third electronic device 403 may disregard the second advertising packet in step 1425. While the second device 202 maintains the connection with the first electronic device 401 using the normal channel, step 1425 may be repeatedly performed at designated time intervals until the channel connection state of the second device 202 or the setting of the maximum allowed connections is not changed further.

The second electronic device 402 may generate a control command for the second device 202 in step 1427. For example, if a user input for designated operation control (e.g., alarm output or information delivery) for the second device 202 is obtained, the second electronic device 402 may identify the state information of the current connection state of the second device 202 based on the advertising packet recently received from the second device 202. If the user input is obtained, the second electronic device 402 may obtain the state information from the second device 202 or the server 300.

The second electronic device 402 may set the connection with the second device 202 using the reserved channel in step 1429. For example, the second electronic device 402 may identify that the normal channel of the second device 202 is currently connected based on the state information obtained from the second device 202, and set the connection with the second device 202 using the reserved channel. If connecting the reserved channel with the second device 202 is successful, the second electronic device 402 may forward information of the reserved channel connection state of the second device 202 to the server 300. If the reserved channel connection with the second device 202 fails, the second electronic device 402 may display a message for notifying the reserved channel connection fail on the display, or output an audio signal notifying the connection fail.

The second device 202 may update its state information in step 1431. For example, the second device 202 may change the state information to indicate that both the normal channel and the reserved channel are connected, and add the changed state information to a field of a third advertising packet.

The second electronic device 402 may forward at least one control command for the second device 202 over the reserved channel previously set in step 1433. For example, while maintaining the connection with the first electronic device 401 over the normal channel, the second device 202 may at least temporarily receive an alarm generation command from the second electronic device 402 over the reserved channel, and output an audio signal in response to the command.

The second device 202 may transmit to the second electronic device 402 a response (e.g., an acknowledgement (ACK) message) indicating that the control command is successfully received from the second electronic device 402 in step 1435.

If the connection identifying request or the control request for the second device 202 is received from the user in step 1437, the third electronic device 403 may scan the changed state information from the second device 202 or the server 300. In step 1439, the third electronic device 403 may identify the connected state of both the normal channel and the reserved channel of the second device 202 and display the connection state information of the second device 202. For example, the third electronic device 403 may display on the display a message notifying that the second device 202 is connected with and controlled by the other nearby device based on the identified channel connection state of the second device 202.

The reserved channel connection set between the second electronic device 402 and the second device 202 may be terminated in step 1441. For example, if the alarm command does not occur for a designated time after the second electronic device 402 forwards at least one alarm command for the second device 202 over the reserved channel, the second electronic device 402 may block the reserved channel connection. The termination condition of the reserved channel may be applied in various manners according to a manufacturer's or user's setting. The second electronic device 402 may block the reserve channel connection and then display a message notifying the reserved channel connection termination on the display.

The second device 202 may update the state information according to the reserved channel termination in step 1443. For example, the second device 202 may change the state information to indicate that the normal channel is connected, and broadcast the changed state information by adding it to the field of the advertising packet.

Figure 15:
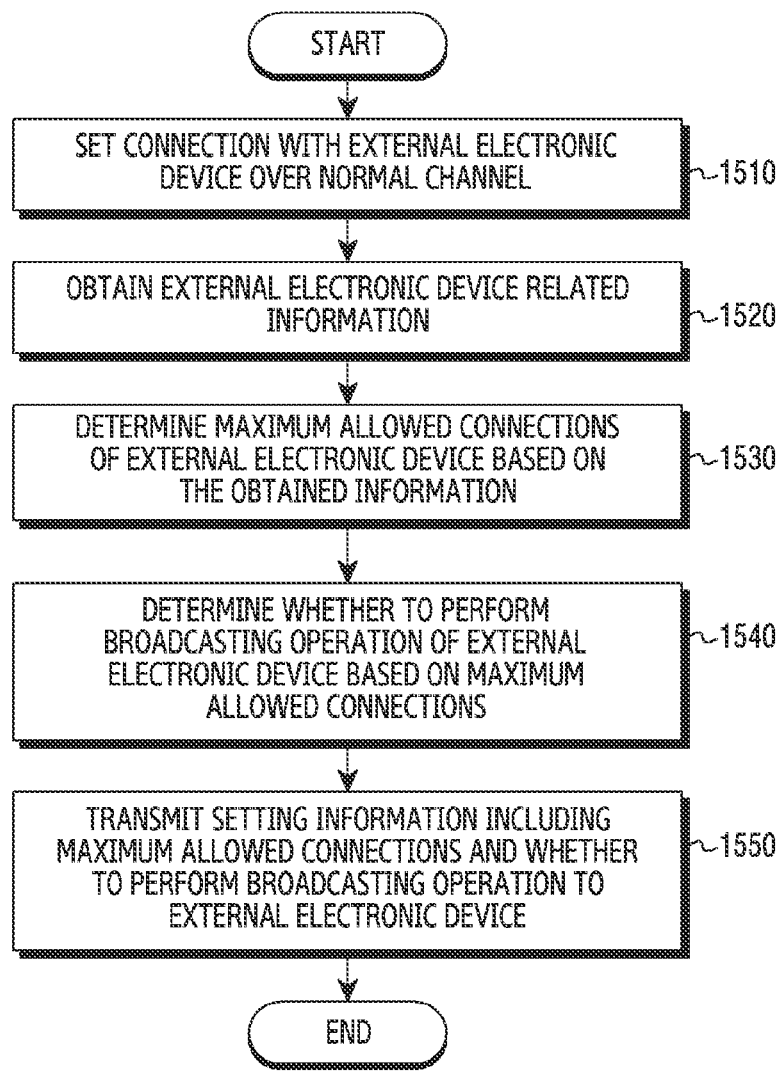
FIG. 15 illustrates a flowchart for setting whether to allow additional connection for a second device in an electronic device according to an embodiment.

FIG. 15 illustrates a flowchart for setting whether to allow additional connection for a second device in an electronic device according to an embodiment. The electronic device which performs operations of FIG. 15 may be the mother terminal of the second device 202, the terminal registered with the same user/group account, or the terminal identified to have a reliable relationship through the service authentication among nearby terminals located within a designated communication distance from the second device 202.

Referring to FIG. 15, the electronic device 400 may set channel connection with the second device 202 using the normal channel in step 1510. For example, the electronic device 400 may receive a first signal broadcast by the second device 202. The first signal may include the identification information of the second device 202 and the state information of the channel connection of the second device 202. If it is identified based on the first signal that the normal channel of the second device 202 is available, the electronic device 400 may set the connection with the second device 202 using the normal channel.

The electronic device 400 may obtain the information of the second device in step 1520. The second device information may include at least one of the connection history, the location information history, or the battery state of the second device 202. For example, the electronic device 400 may transmit the first signal including the location information of the second device 202 to the server 300 at the designated time intervals, and obtain from the server 300 the connection history including the number of other electronic devices connected to the second device 202 and information of the other devices in response to the first signal. Alternatively, the electronic device 400 may transmit to the server 300 a second signal requesting the second device information and obtain the location information history of the second device from the server 300 in response to the second signal. The electronic device 400 may identify whether the second device 202 is connected with at least one other electronic device by analyzing the obtained location information history. If the connection with the second device 202 is set, the electronic device 400 may identify the battery state from the second device 202.

The electronic device 400 may determine the maximum allowed connections of the second device 202 based on the obtained second device information in step 1530. The electronic device 400 may identify based on the second device information whether the designated condition for the second device 202 is satisfied, and determine the maximum allowed connections of the second device 202 according to the identifying result. The designated condition may include at least one of whether there is at least one other electronic device connected with the second device 202 for the designated time or whether the battery of the second device 202 is over the designated level. For example, if it is identified based on the second device information that there is no at least one other electronic device connected with the second device 202 for the designated time, the electronic device 400 may determine the maximum allowed connections for the second device 202 to be 1. If the presence of at least one other electronic device connected with the second device 202 is identified for the designated time based on the second device information, the electronic device 400 may determine the maximum allowed connections for the second device 202 to be at least 2. If it is identified based on the second device information that the battery state is below the designated level, the electronic device 400 may determine the maximum allowed connections to be 1. If it is identified based on the second device information that the battery state is over the designated level, the electronic device 400 may determine the maximum allowed connections to be at least 2.

Figure 16:
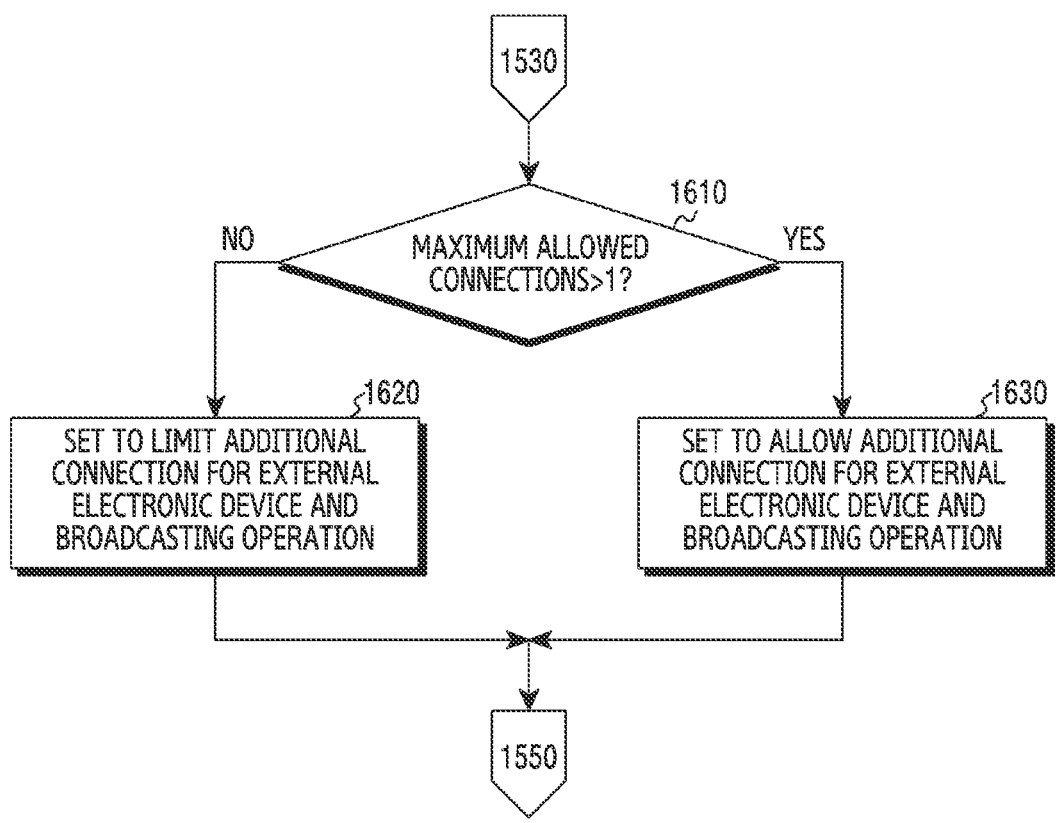
FIG. 16 illustrates a flowchart for determining whether to allow additional connection of a second device in an electronic device according to an embodiment.

The electronic device 400 may determine whether to perform the broadcasting operation of the second device 202 based on the determined maximum allowed connections in step 1540. FIG. 16 illustrates a flowchart for determining whether to allow additional connection of a second device in an electronic device according to an embodiment.

Referring to FIG. 16, the electronic device 400 may identify whether the determined maximum allowed connections for the second device 202 exceed 1 in step 1610. If identifying that the determined maximum allowed connections do not exceed 1 (i.e., NO at step 1610) according to the identifying result, the electronic device 400 may determine to limit additional connection with other electronic device with respect to the second device 202 in step 1620. If the additional connection is limited, the electronic device 400 may set not to perform the operation of broadcasting the signal including the identification information and the connection state information with respect to the second device 202, thus preventing unnecessary battery consumption of the second device 202.

If it is identified that the determined maximum allowed connections exceed 1 (i.e., YES at step 1610) according to the identifying result, the electronic device 400 may determine to allow the additional connection with other electronic device with respect to the second device 202 in step 1630. If the additional connection is allowed, the electronic device 400 may set to perform the operation of broadcasting the signal including the identification information and the connection state information with respect to the second device 202. In this case, the second device 202 may be connected with another nearby electronic device receiving the broadcast signal through the reserved channel.

Referring back to FIG. 15, the electronic device 400 may transmit to the second device 202 the setting information including the determined maximum allowed connections and whether to perform the broadcasting information in step 1550. For example, if the maximum allowed connections are determined to be 1, the electronic device 400 may transmit the setting information indicating that the additional connection with other electronic device is limited with respect to the second device 202 and there is no need to perform the broadcasting operation. If the maximum allowed connections are determined to be at least 2, the electronic device 400 may transmit the setting information indicating the maximum allowed connections and to perform the broadcasting operation with respect to the second device 202.

Figure 17:
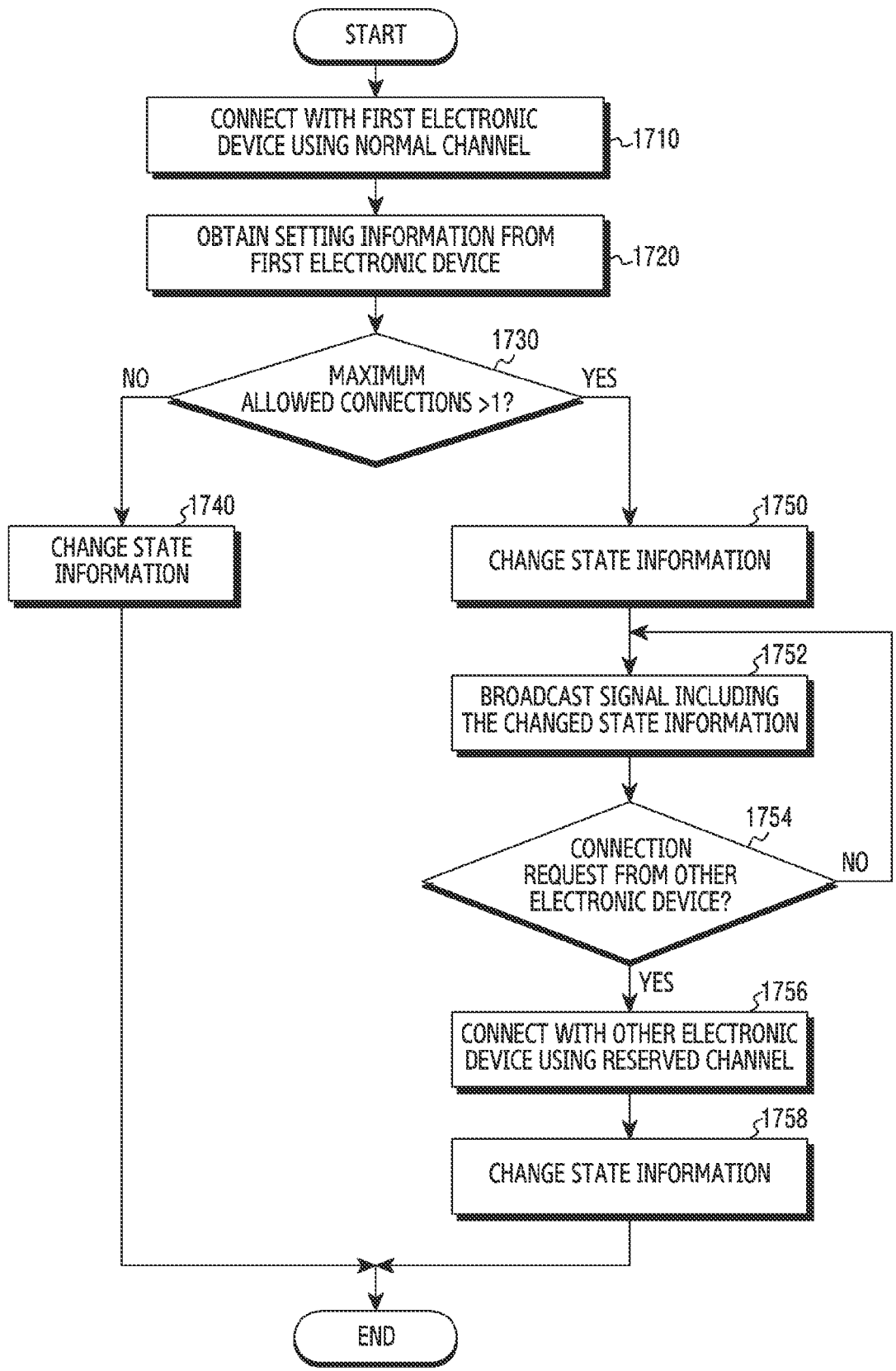
FIG. 17 illustrates a flowchart for setting and managing a wireless connection state in a second device according to an embodiment.

FIG. 17 illustrates a flowchart for setting and managing a wireless connection state in a second device according to an embodiment.

Referring to FIG. 17, the second device 202 may connect the normal channel with the first electronic device 401, in response to receiving the connection request from the first electronic device 401 in step 1710. For example, the first electronic device 401 may be registered with the same account as the second device 202 among the nearby electronic devices receiving the signal broadcast by the second device 202 of the offline state or the device identified to be reliable through the service authentication. The normal channel may be for the second device 202 to transmit and receive data while continuously maintaining the connection with the external device. If it is identified that the normal channel is not connected upon receiving the connection request from the external device, the second device 202 may set the connection with the external device using the normal channel.

The second device 202 may obtain the setting information from the first electronic device 401 in step 1720. The setting information may include the maximum allowed connections determined for the second device 202 or whether to perform the broadcasting operation.

The second device 202 may identify the maximum allowed connections based on the setting information obtained from the first electronic device 401 in step 1730. If it is identified that the maximum allowed connections do not exceed 1 (i.e., NO at step 1730) according to the identifying result, the second device 202 may change its state information in step 1740. The second device 202 may recognize that there is no need to broadcast the signal including the changed state information based on the setting information, and may not broadcast the information until the connection state is changed or new setting information is obtained.

If it is identified that the maximum allowed connections exceed 1 (i.e., YES at step 1730) according to the identifying result, the second device 202 may change its state information in step 1750. The second device 202 may change the state information to indicate that the normal channel is connected, and add the changed state information to the field of the first signal. The second device 202 may broadcast the first signal including the changed state information in step 1752. The first signal may be obtained by other nearby electronic devices within a designated short-range network communication distance from the second device 202. The second device 202 may identify whether there is a connection request from another electronic device in step 1754. The other electronic device may be registered with the same account as the second device 202 among the nearby electronic devices receiving the first signal or the device identified to be reliable through the service authentication. If there is no connection request from another electronic device (i.e., NO at step 1754) according to the identifying result, the second device 202 may repeatedly perform step 1752 at designated time intervals until receiving a connection request from another electronic device.

If there is the connection request from another electronic device (i.e., YES at step 1754) according to the identifying result, the second device 202 may set the connection with the other electronic device using the reserved channel in step 1756. The reserved channel may be the channel for at least temporarily delivering the control information to the second device 202, allowing the connection setting for the designated time. The second device 202 may change its state information to indicate that both the normal channel and the reserved channel are connected in step 1758. The second device 202 may receive at least one control command from the other electronic device while maintaining the reserved channel, and terminate the connection of the reserved channel if there is no control command for the designated time after receiving the at least one control command. If the reserved channel is terminated, the second device 202 may rechange its state information to indicate that only the normal channel is connected.

If it is identified that both the normal channel and the reserved channel are disconnected, the second device 202 may rechange the state information to indicate that the normal channel is not connected, and broadcast a signal including the rechanged state information.

Figure 18:
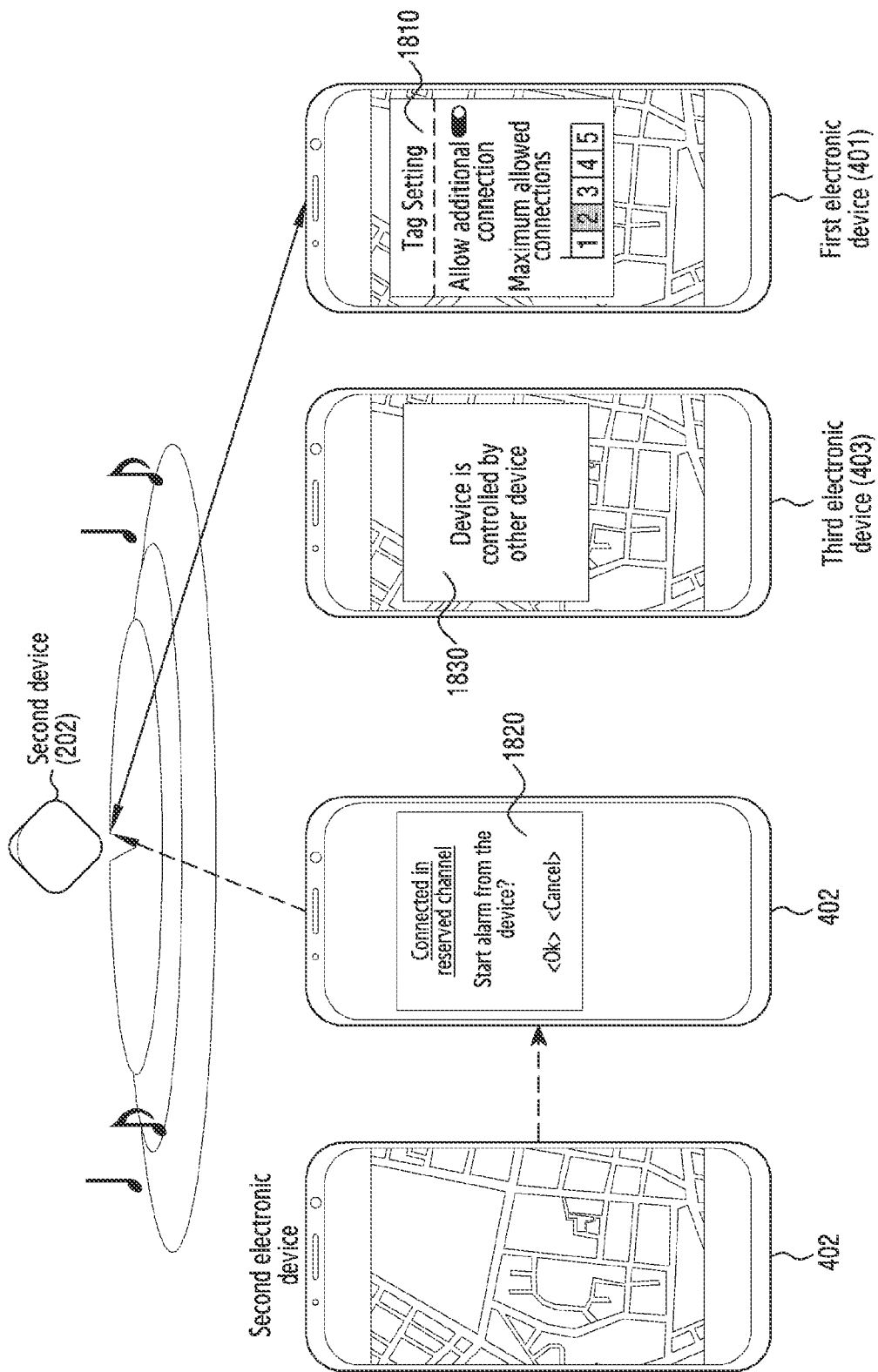
FIG. 18 illustrates a user interface provided based on a connection setting state with a second device in one or more electronic devices according to an embodiment.

FIG. 18 illustrates a user interface provided based on a connection setting state with a second device in one or more electronic devices according to an embodiment. In FIG. 18, the first through third electronic devices 401, 402, and 403 may be the electronic devices for inter-operating with the second device 202 among the nearby electronic devices which obtain the signal broadcast by the second device 202. For example, the first through third electronic devices 401, 402, and 403 may be understood as the mother terminal of the second device 202, the terminal registered with the same user/group account, or the terminal identified to be reliable through the service authentication.

Referring to FIG. 18, the second device 202 may broadcast the first signal including its identification information and state information. The state information may indicate the connection states of the normal channel and the reserved channel of the second device 202.

The first electronic device 401 may identify the state information of the second device 202 based on the first signal and request the connection with the second device 202. If it is identified that the normal channel of the second device 202 is not connected, the first electronic device 401 may set the connection with the second device 202 using the normal channel After setting the connection with the second device 202 over the normal channel, the first electronic device 401 may set whether additional connection is possible for the second device 202 or the maximum allowed connections. The first electronic device 401 may determine whether to allow the additional connection of the second device 202 or the maximum allowed connections based on the second device information. The second device information may include at least one of the connection history, the location information history, or the battery state of the second device 202. For example, the first electronic device 401 may transmit the location information of the second device 202 to the server 300 at the designated time intervals (e.g., 30 minutes or 1 hour), and obtain the connection history of the second device 202 in response to the transmission of the location information. Alternatively, the first electronic device 401 may request the second device information from the server 300, and obtain the location information history of the second device 202 in response to the request. The first electronic device 401 may identify the battery state of the second device through the normal channel set for the second device 202. The first electronic device 401 may identify based on the second device information whether the designated condition for the second device 202 is satisfied, and determine whether to allow the additional connection or the maximum allowed connections of the second device 202 according to the identifying result. For example, the first electronic device 401 may identify presence of at least one other electronic device connected with the second device 202 for the designated time based on the second device information, or if the battery state of the second device 202 is over the designated level, allow the additional connection for the second device 202 and determine the maximum allowed connections to be at least 2.

The first electronic device 401 may automatically transmit the setting information corresponding to the determination to the second device 202 over the normal channel. The first electronic device 401 may provide an additional connection setting screen 1810 for the second device 202 on the display. In this case, the first electronic device 401 may display whether to allow the additional connection or the maximum allowed connections determined based on the second device information in the setting screen 1810 and guide the user to accept it. The user may arbitrarily set whether to allow the additional connection or the maximum allowed connections for the second device 202 through the setting screen 1810.

If the additional connection is allowed for the second device 202 (or the maximum allowed connections are set to be at least 2), the second device 202 may broadcast a signal including its state information. For example, the second device 202 may change the state information to indicate that the normal channel is connected, and broadcast the changed state information by including it in the second signal.

The second electronic device 402 may identify the state information of the second device 202 based on the second signal and request the connection with the second device 202. For example, if it is identified that the normal channel of the second device 202 is connected, the second electronic device 402 may set the connection with the second device 202 using the reserved channel. If it is identified that the normal channel is connected, the second electronic device 402 may determine that the second device 202 is controlled by another electronic device and may not perform the location information update of the second device 202. The second electronic device 402 may forward an operation control command or an information transmission command for the second device 202 over the reserved channel while the reserved channel is maintained and display a user interface 1820 related to the control information on the display.

The second device 202 may, if connected with the second electronic device 402 over the reserved channel, change its state information to indicate that both the normal channel and the reserved channel are connected.

If a connection identifying request or a control request for the second device 202 is received from the user, the third electronic device 403 may obtain the third signal including the changed state information from the second device 202. The third electronic device 403 may identify based on the third signal that both the normal channel and the reserved channel of the second device 202 are connected, and display a user interface 1830 including information related to the channel connection state on the display. If it is identified that both the normal channel and the reserved channel are connected, the third electronic device 403 may determine that the second device 202 is controlled by another electronic device and may not perform the location information update of the second device 202.

As described above, an electronic device may include a communication module supporting a wireless communication connection, at least one processor operatively connected with the communication module, and a memory operatively connected with the at least one processor. The memory may store instructions, when executed, causing the at least one processor to, set channel connection with an external electronic device through the communication module, obtain information related to the external electronic device, determine maximum allowed connections of the external electronic device or whether to perform broadcasting of the external electronic device based on the information related to the external electronic device, and transmit setting information including at least one of the determined maximum allowed connections or whether to perform the broadcasting to the external electronic device.

The instructions may cause the at least one processor to transmit a first signal including location information of the external electronic device to an external server at designated time intervals using the communication module and obtain the external electronic device information including connection history of the external electronic device from the external server in response to the first signal.

The instructions may cause the at least one processor to transmit a second signal for requesting location information history of the external electronic device to an external server using the communication module and obtain the external electronic device information including the location information history from the external server in response to the second signal.

The instructions may cause the at least one processor to, if the connection with the external electronic device is set, obtain the external electronic device information including a battery state from the external electronic device.

The instructions may cause the at least one processor to identify whether a designated condition is satisfied with respect to the external electronic device based on the external electronic device information and determine the maximum allowed connections of the external electronic device based on the identifying result. The designated condition may include at least one of whether there is at least one other electronic device connected with the external electronic device for a designated time, or whether a battery state of the external electronic device is over a designated level.

The instructions may cause the at least one processor to, if it is identified that the designated condition is not satisfied with respect to the external electronic device, determine the maximum allowed connections of the external electronic device to 1, and transmit to the external electronic device the setting information indicating no need to perform the broadcasting with respect to the external electronic device.

The instructions may cause the at least one processor to, if it is identified that the designated condition is satisfied with respect to the external electronic device, determine the maximum allowed connections of the external electronic device to be at least 2, and transmit to the external electronic device the setting information indicating to perform the broadcasting with respect to the external electronic device.

The channel connection may be set based on a BLE communication protocol.

The electronic device may further include a display, and the instructions may cause the at least one processor to display a setting screen for changing the maximum allowed connections of the external electronic device on the display.

The instructions may cause the at least one processor to, in response to receiving from an external server a third signal indicating presence of at least one other electronic device which requests additional connection for the external device, display the setting screen on the display.

As described above, a method of an electronic device for controlling an external electronic device may include setting channel connection with the external electronic device, obtaining information related to the external electronic device, determining maximum allowed connections of the external electronic device or whether to perform broadcasting of the external electronic device based on the external electronic device information, and transmitting setting information including at least one of the determined maximum allowed connections or whether to perform the broadcasting to the external electronic device.

Obtaining the external electronic device information may include transmitting a first signal including location information of the external electronic device to an external server at designated time intervals, and obtaining the external electronic device information including connection history of the external electronic device from the external server in response to the first signal.

Obtaining the external electronic device information may include transmitting a second signal for requesting location information history of the external electronic device to an external server, and obtaining the external electronic device information including the location information history from the external server in response to the second signal.

Obtaining the external electronic device information may include, if the connection with the external electronic device is set, obtaining the external electronic device information including a battery state from the external electronic device.

Determining the maximum allowed connections of the external electronic device or whether to perform the broadcasting of the external electronic device may further include identifying whether a designated condition is satisfied with respect to the external electronic device based on the external electronic device information, and determining the maximum allowed connections of the external electronic device based on the identifying result, and the designated condition may include at least one of whether there is at least one other electronic device connected with the external electronic device for a designated time, or whether a battery state of the external electronic device is over a designated level.

Determining the maximum allowed connections of the external electronic device may include, if it is identified that the designated condition is not satisfied with respect to the external electronic device, determining the maximum allowed connections of the external electronic device to be 1, and transmitting to the external electronic device the setting information indicating no need to perform the broadcasting with respect to the external electronic device.

Determining the maximum allowed connections of the external electronic device may include, if it is identified that the designated condition is satisfied with respect to the external electronic device, determining the maximum allowed connections of the external electronic device to be at least 2, and transmitting to the external electronic device the setting information indicating to perform the broadcasting with respect to the external electronic device.

The channel connection may be set based on a BLE communication protocol.

The method may further include outputting a message for changing the maximum allowed connections of the external electronic device.

Outputting the message for changing the maximum allowed connections of the external electronic device may include, in response to receiving from an external server a third signal indicating presence of at least one other electronic device which requests additional connection for the external device, displaying the message on a display of the electronic device.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device comprising:
   a communication module supporting a wireless communication connection;
   at least one processor operatively connected with the communication module; and
   a memory operatively connected with the at least one processor,
   wherein the memory stores instructions which, when executed, cause the at least one processor to:
   set a channel connection with an external electronic device through the communication module,
   obtain information related to the external electronic device,
   determine maximum allowed connections of the external electronic device or whether to perform broadcasting of the external electronic device based on the information related to the external electronic device, and
   transmit, to the external electronic device, setting information comprising at least one of the determined maximum allowed connections or whether to perform the broadcasting,
   transmit a first signal comprising location information of the external electronic device to an external server at designated time intervals using the communication module, and
   obtain the external electronic device information comprising connection history of the external electronic device from the external server in response to the first signal.

2. The electronic device of claim 1, wherein the instructions further cause the at least one processor to:
   transmit a second signal for requesting location information history of the external electronic device to an external server using the communication module, and
   obtain the external electronic device information comprising the location information history from the external server in response to the second signal.

3. The electronic device of claim 1, wherein the instructions further cause the at least one processor to,
   obtain, if the connection with the external electronic device is set, the external electronic device information comprising a battery state from the external electronic device.

4. The electronic device of claim 1, wherein the instructions further cause the at least one processor to:
   identify whether a designated condition is satisfied with respect to the external electronic device based on the external electronic device information, and
   determine the maximum allowed connections of the external electronic device based on the identifying result,
   wherein the designated condition comprises at least one of whether there is at least one other electronic device connected with the external electronic device for a designated time, or whether a battery state of the external electronic device is over a designated level.

5. The electronic device of claim 4, wherein the instructions further cause the at least one processor to:
   if it is identified that the designated condition is not satisfied with respect to the external electronic device, determine the maximum allowed connections of the external electronic device to be 1, and
   transmit to the external electronic device the setting information indicating no need to perform the broadcasting with respect to the external electronic device.

6. The electronic device of claim 4, wherein the instructions further cause the at least one processor to:
   if it is identified that the designated condition is satisfied with respect to the external electronic device, determine the maximum allowed connections of the external electronic device to be at least 2, and
   transmit to the external electronic device the setting information indicating to perform the broadcasting with respect to the external electronic device.

7. The electronic device of claim 1, wherein the channel connection is set based on a Bluetooth™ low energy (BLE) communication protocol.

8. The electronic device of claim 1, further comprising:
a display,
wherein the instructions further cause the at least one processor to display a setting screen for changing the maximum allowed connections of the external electronic device on the display.

9. The electronic device of claim 8, wherein the instructions further cause the at least one processor to, in response to receiving from an external server a third signal indicating presence of at least one other electronic device which requests an additional connection for the external device, display the setting screen on the display.

10. A method of an electronic device for controlling an external electronic device, comprising:
setting a channel connection with the external electronic device;
obtaining information related to the external electronic device;
determining maximum allowed connections of the external electronic device or whether to perform broadcasting of the external electronic device based on the external electronic device information;
transmitting setting information comprising at least one of the determined maximum allowed connections or whether to perform the broadcasting to the external electronic device;
transmitting a first signal comprising location information of the external electronic device to an external server at designated time intervals; and
obtaining the external electronic device information comprising connection history of the external electronic device from the external server in response to the first signal.

11. The method of claim 10, wherein obtaining the external electronic device information comprises:
transmitting a second signal for requesting location information history of the external electronic device to an external server; and
obtaining the external electronic device information comprising the location information history from the external server in response to the second signal.

12. The method of claim 10, wherein obtaining the external electronic device information comprises:
if the connection with the external electronic device is set, obtaining the external electronic device information comprising a battery state from the external electronic device.

13. The method of claim 10, wherein determining the maximum allowed connections of the external electronic device or whether to perform the broadcasting of the external electronic device further comprises:
identifying whether a designated condition is satisfied with respect to the external electronic device based on the external electronic device information; and
determining the maximum allowed connections of the external electronic device based on the identifying result, and
wherein the designated condition comprises at least one of whether there is at least one other electronic device connected with the external electronic device for a designated time, or whether a battery state of the external electronic device is over a designated level.

14. The method device of claim 13, wherein determining the maximum allowed connections of the external electronic device comprises:
if it is identified that the designated condition is not satisfied with respect to the external electronic device, determining the maximum allowed connections of the external electronic device to be 1; and
transmitting to the external electronic device the setting information indicating no need to perform the broadcasting with respect to the external electronic device.

15. The method of claim 13, wherein determining the maximum allowed connections of the external electronic device comprises:
if it is identified that the designated condition is satisfied with respect to the external electronic device, determining the maximum allowed connections of the external electronic device to be at least 2; and
transmitting to the external electronic device the setting information indicating to perform the broadcasting with respect to the external electronic device.

16. The method of claim 10, wherein the channel connection is set based on a Bluetooth™ low energy (BLE) communication protocol.

17. The method of claim 10, further comprising:
outputting a message for changing the maximum allowed connections of the external electronic device.

18. The method of claim 17, wherein outputting the message for changing the maximum allowed connections of the external electronic device comprises:
in response to receiving from an external server a third signal indicating presence of at least one other electronic device which requests additional connection for the external device, displaying the message on a display of the electronic device.

* * * * *